US008144928B2

(12) United States Patent
Ohba et al.

(10) Patent No.: US 8,144,928 B2
(45) Date of Patent: Mar. 27, 2012

(54) OBJECT MONITORING METHOD, OBJECT MONITORING APPARATUS, AND OBJECT MONITORING PROGRAM STORAGE MEDIUM

(75) Inventors: Ryoji Ohba, Sapporo (JP); Hirofumi Yamashita, Kakogawa (JP); Isao Hayashi, Tokyo (JP)

(73) Assignees: Kansai Coke and Chemicals Co., Ltd., Hyogo (JP); Yamatake Corporation, Tokyo (JP)

( * ) Notice: Subject to any disclaimer, the term of this patent is extended or adjusted under 35 U.S.C. 154(b) by 987 days.

(21) Appl. No.: 12/084,993

(22) PCT Filed: Nov. 22, 2006

(86) PCT No.: PCT/JP2006/323312
§ 371 (c)(1),
(2), (4) Date: May 14, 2008

(87) PCT Pub. No.: WO2007/060987
PCT Pub. Date: May 31, 2007

(65) Prior Publication Data
US 2009/0238450 A1 Sep. 24, 2009

(30) Foreign Application Priority Data

Nov. 24, 2005 (JP) ................................. 2005-339271

(51) Int. Cl.
*G06K 9/00* (2006.01)
*G06K 9/36* (2006.01)
(52) U.S. Cl. .......................... 382/103; 382/165; 382/166
(58) Field of Classification Search .................. 382/100, 382/103, 165, 194, 195, 166; 235/376, 375; 342/73; 345/418, 422–427, 473–474; 348/142–144, 348/148–149, 154–155, 161, 169–172, 699–700
See application file for complete search history.

(56) References Cited

U.S. PATENT DOCUMENTS 5,121,446 A 6/1992 Yamada et al.
5,408,338 A 4/1995 Koike
(Continued)

FOREIGN PATENT DOCUMENTS

JP 2-210959 8/1990
(Continued)

OTHER PUBLICATIONS

English translation for Japan Patent Publication JP 11-296653, (Sanyo Electric Co., Ltd.), Oct. 29, 1999, Asano Masakazu et al.*
(Continued)

*Primary Examiner* — Samir Ahmed
*Assistant Examiner* — Mehdi Rashidian

(57) ABSTRACT

A method includes a pixel-value correction step that causes an average and variance of pixel values in a second subregion inclusive of a first subregion inclusive of being formed of only one pixel in a comparison image resolved into pixels to match with an average and variance of pixel values in a subregion corresponding to the second subregion on a reference image similarly resolved into pixels, thereby to execute calculation that corrects the pixel value of each pixel in the first subregion in the comparison image by recognizing each of subregions to be the first subregion, the subregions being obtained when the comparison image is divided into the subregions respectively inclusive of being formed of only one pixel; and a change determination step that determines the presence/absence of a change in the object by comparing the reference image with a post-correction comparison image acquired through the pixel value correction step.

24 Claims, 19 Drawing Sheets (a) REFERENCE VALUE SIDE (b) COMPARISON SIDE (c) AFTER CORRECTION IN (b)

U.S. PATENT DOCUMENTS

| | | | |
|---|---|---|---|
| 6,134,355 A | 10/2000 | Yamada et al. | |
| 6,141,441 A * | 10/2000 | Cass et al. | 382/166 |
| 6,570,608 B1 * | 5/2003 | Tserng | 348/143 |
| 2010/0053367 A1 * | 3/2010 | Nanu et al. | 348/224.1 |
| 2010/0066697 A1 * | 3/2010 | Jacomet et al. | 345/173 |

FOREIGN PATENT DOCUMENTS

| | | |
|---|---|---|
| JP | 4-330576 | 11/1992 |
| JP | 5-236260 | 9/1993 |
| JP | 11-296653 | 10/1999 |
| JP | 2002-150440 | 5/2002 |
| JP | 2003-263644 | 9/2003 |
| JP | 2005-135014 | 5/2005 |

OTHER PUBLICATIONS

English translation for Japan Patent Publication JP 2005-135014, (Hitachi Kokusai Electric Inc.), May 26, 2005, Ito Wataru.*

International Search Report mailed Feb. 27, 2007 for International Application No. PCT/JP2006/323312.

International Preliminary Report on Patentability mailed on Jun. 5, 2008 and issued in corresponding International Patent Application No. PCT/JP2006/323312.

Japanese Decision of Refusal issued Jun. 28, 2011 in corresponding Japanese Patent Application 2005-339271.

* cited by examiner

Fig. 7

OBJECT MONITORING METHOD, OBJECT MONITORING APPARATUS, AND OBJECT MONITORING PROGRAM STORAGE MEDIUM

CROSS REFERENCE TO RELATED APPLICATIONS

This application claims the benefit under 35 U.S.C. Section 371, of PCT International Application No. PCT/JP2006/323312, filed Nov. 22, 2006, which claimed priority to Japanese Application No. 2005-339271, filed Nov. 24, 2005 in Japan, the contents of which are incorporated herein by reference.

TECHNICAL FIELD

The present invention relates to an object monitoring method and an object monitoring apparatus that compare two images acquired by capturing an object in a time interval, thereby to monitor the presence or absence of a change in the object; and the invention further relates to an object monitoring program storage medium which stores an object monitoring program that is executed in an information processing apparatus, such as a computer, thereby to cause the information processing apparatus to operate as the object monitoring apparatus.

BACKGROUND ART

As computers have evolved in processing capacity in recent year, there is expected for an image-using system for executing, for example, measurement and monitoring that was not easily realized until then due to the large amount and complexity of data to be processed thereby. In particular, with the use of conventional monitoring systems, there are many cases where video images sent from a monitor camera is verified through the human eye, so that there is expected to implement automation of the verification operation.

As one field in which such automation is expected, there is a scene of gas leakage from a coke oven in a steel making plant. In many cases, such gas leakage occurs from an oven lid, and is considered to result from causes, such as warpage of the oven lid due to high temperature, corrosion of a contact surface, and intrusion of foreign matters such as coal, coke, and tar. In recent years, ovens having a construction that is less likely to cause gas leakage have been developed. To date, however, no oven lids completely free from causing gas leakage over a long period of time have been available. When gas leakage caused due to continuation of operation occurs, stopping operation is carried out by the worker. In such a present situation, although gas leakage portions are repaired by necessity, detection of such gas leakage portions is carried out only by the worker. For such a coke oven that normally is used on a round-the-clock basis, there is expected to realize an apparatus capable of automatically detecting gas leakage from the oven lid. In this case, when an image of gas leakage is viewed by the human, the gas leakage can be found quickly or at one glance. An easiest way to find gas leakage from image information, an image captured under exactly the same conditions as a gas leakage image in regard to the weather of the day and the position of the camera can be subtracted from the gas leakage image, thereby a resultant image thus obtained shows only a gas leakage portion.

However, it is significantly difficult to create the same conditions in regard to the weather of the day, i.e., the illumination conditions. Since the illumination conditions are different from one another, when images are captured under different conditions, there remain portions other than the gas leakage portion.

Thus, when attempting to mechanically and quantitatively extract even such a change quickly recognizable to the human, a difference in image capture condition, such as an illumination condition, results in imposing a significant hindrance. As such, there arises the necessity of performing processing, such as correction, of the images to prevent the problem described above. Further, in many cases, image information is multidimensional as having density values R, G, and B of positions x, y, so that it is necessary to successfully acquire the image characteristics from the information.

In view of the circumstances described above, an object of the present invention is to provide an object monitoring method, an object monitoring apparatus, and an object monitoring program storage medium that are capable of accurately acquiring a change between two images by acquiring information of the images even when image capture conditions, such as illumination conditions, are different from one another in the events of capturing the images (one of the two images will be referred to as a "reference image", and the other will be referred to as a "comparison image", herebelow).

DISCLOSURE OF THE INVENTION

An object monitoring method of the present invention to achieve the object monitors the presence or absence of a change in an object by performing a comparison between a reference image acquired by capturing the object and a comparison image acquired by capturing the object, the object monitoring method including:

a pixel value correction step that causes an average and variance of pixel values in a second subregion inclusive of a first subregion inclusive of being formed of only one pixel in a comparison image resolved into plural pixels to match with an average and variance of pixel values in a subregion corresponding to the second subregion on a reference image similarly resolved into plural pixels, thereby to execute a calculating operation that corrects the pixel value of each pixel in the first subregion in the comparison image by recognizing each of plural subregions to be the first subregion, the plural subregions being obtained when the comparison image is divided into the plural subregions respectively inclusive of being formed of only one pixel; and a change determination step that determines the presence or absence of a change in the object by performing a comparison between the reference image and a post-correction comparison image acquired through the pixel value correction step.

Either one of the two images may be the reference image. In the pixel value correction, and the pixel values of the two images, namely, the reference image and the comparison image, may be caused to match with a third average and variance provided independently thereof.

The object monitoring method of the present invention includes the pixel value correction step and corrects the pixel values so as to match with the average and variance in units of a local region. As such, the illumination condition can be corrected with high accuracy, and the presence or absence of a change between the reference image and the comparison image can be determined with high accuracy.

The object monitoring method of the present invention may further include a differential calculating operation step that obtains a differential image formed from differentials between the pixel values of mutually corresponding pixels of the reference image and the post-correction comparison image acquired through the pixel value correction step, wherein the change determination step is a step that determines the presence or absence of a change in the object in accordance with the differential image acquired at the differential calculating operation step.

With the differential image thus obtained, a change between the reference image and the post-correction comparison image can easily be captured.

Further, in the object monitoring method of the present invention, it is preferable that the pixel value correction step is a step that executes the calculating operation by recognizing the respective one pixel forming the comparison image to be the first subregion.

By execution of the calculating operation by recognizing the respective one pixel to be the first subregion, the correction can be executed with even higher accuracy. However, a set of plural images may be set as the first subregion, thereby a high speed computation can be implemented.

Further, according to the object monitoring method of the present invention, the pixel value correction step may be a step that executes correction in a manner that, where the average and variance of the pixel values in the second subregion inclusive of the first subregion in the event that either one pixel present in a position (x, y) in the comparison image or a set of plural pixels present in positions (x, y) when x, y is a variable are, respectively, represented by $E_1$ and $S_1^2$, and the average and variance of the pixel values in the subregion corresponding to the second subregion of the reference image are, respectively, represented as $E_0$ and $S_0^2$, a pixel value $f_1(x, y)$ of the pixel present in the position (x, y) in the comparison image is corrected, in accordance with $$g(x, y) = \sqrt{\frac{S_0^2}{S_1^2}} (f_1(x, y) - E_1) + E_0 \quad (1)$$

to a post-correction pixel value g(x, y).

In specific, the pixel value can be corrected in accordance with Expression (1), for example.

Further, according to the object monitoring method of the present invention, the pixel value correction step may be a step that determines whether an edge is included in the second subregion and that, when the edge is included in the second subregion, executes correction in a manner that, where the average and variance of the pixel values in the second subregion inclusive of the first subregion in the event that either one pixel present in a position (x, y) in the comparison image or a set of plural pixels present in positions (x, y) when x, y is a variable are, respectively, represented by $E_1$ and $S_1^2$, the average and variance of the pixel values in the subregion corresponding to the second subregion of the reference image are, respectively, represented as $E_0$ and $S_0^2$, and when $$h(x, y) = \begin{cases} 1 & f_0(x, y) \geq E_0 \\ -1 & f_0(x, y) < E_0, \end{cases}$$

a pixel value $f_1(x, y)$ of the pixel present in the position (x, y) in the comparison image is corrected, in accordance with $$g(x, y) = \sqrt{\frac{S_0^2}{S_1^2}} h(x, y)(f_1(x, y) - E_1) + E_0 \quad (2)$$

to a post-correction pixel value g(x, y).

A case can occur where the luminances of two regions between an edge on a border are inverted depending upon a difference between an illumination direction of the object in the event that the reference image has been acquired and an illumination direction in the event that the comparison image has been acquired. Even in such a case, the correction with high accuracy can be executed in accordance with Expression (2).

While no limitations are imposed on the method of determining whether the edge is included in the second subregion, it can be determined that the edge is included in the second subregion when the variance of the pixel values in the second subregion exceeds a predetermined threshold value, for example.

Further, according to the object monitoring method of the present invention, it may be that the reference image and the comparison image are, respectively, color images where pixel values of plural colors are correlated to the respective pixels; the pixel value correction step is a step that executes the calculating operation for at least one color; and the change determination step is a step that determines the presence or absence of a change in the object by performing a comparison for at least one color between the reference image and the post-correction comparison image acquired through the pixel value correction step.

Even in the case of the color images, when it is preliminarily known that the presence or absence of a change appears with a specific color, the presence or absence of the change can be determined by executing the calculating operation only for the color.

Alternatively, according to the object monitoring method of the present invention, it may be that the reference image and the comparison image are, respectively, color images where plural color pixel values are correlated to the respective pixels; the pixel value correction step is a step that executes the calculating operation for respective ones of the plural colors; and the change determination step is a step that obtains distances in color space between either mutually corresponding pixels or regions between the reference image and the post-correction comparison image acquired through the pixel value correction step and that determines the presence or absence of a change in the object in accordance with the distances.

As in such a manner, in the case of a color image, the presence or absence of a change may be determined by summing plural colors together.

Further, it is preferable that the object monitoring method of the present invention includes a misalignment correction step that corrects a positional misalignment and/or rotational misalignment between the reference image and the comparison image, the misalignment correction being executed before the pixel value correction step.

With the provision of the misalignment correction step, the determination for a change can be implemented with high accuracy when there is a risk of occurrence of, for example, a positional misalignment of a camera.

Further, an object monitoring apparatus of the present invention to achieve the object monitors the presence or absence of a change in an object by performing a comparison between a reference image acquired by capturing the object and a comparison image acquired by capturing the object, the object monitoring apparatus including:

a pixel value correction section that causes an average and variance of pixel values in a second subregion inclusive of a first subregion inclusive of being formed of only one pixel in a comparison image resolved into plural pixels to match with an average and variance of pixel values in a subregion corresponding to the second subregion on a reference image similarly resolved into plural pixels, thereby to execute a calculating operation that corrects the pixel value of each pixel in the first subregion in the comparison image by recognizing each of plural subregions to be the first subregion, the plural subregions being obtained when the comparison image is divided into the plural subregions respectively inclusive of being formed of only one pixel; and a change determination section that determines the presence or absence of a change in the object by performing a comparison between the reference image and a post-correction comparison image acquired by being corrected in the pixel value correction section.

It may be that the object monitoring apparatus of the present invention further includes a differential calculating operation section that obtains a differential image formed from differentials between the pixel values of mutually corresponding pixels of the reference image and the post-correction comparison image acquired through the pixel value correction section, and the change determination section determines the presence or absence of a change in the object in accordance with the differential image acquired at the differential calculating operation section.

Further, in the object monitoring apparatus of the present invention, it is preferable that the pixel value correction section executes the calculating operation by recognizing the respective one pixel forming the comparison image to be the first subregion.

Further, in the object monitoring apparatus of the present invention, it may be that the pixel value correction section executes correction in a manner that, where the average and variance of the pixel values in the second subregion inclusive of the first subregion in the event that either one pixel present in a position (x, y) in the comparison image or a set of plural pixels present in positions (x, y) when x, y is a variable are, respectively, represented by $E_1$ and $S_1^2$, and the average and variance of the pixel values in the subregion corresponding to the second subregion of the reference image are, respectively, represented as $E_0$ and $S_0^2$, a pixel value $f_1(x, y)$ of the pixel present in the position (x, y) in the comparison image is corrected, in accordance with $$g(x, y) = \sqrt{\frac{S_0^2}{S_1^2}} (f_1(x, y) - E_1) + E_0 \quad (1)$$

to a post-correction pixel value g(x, y).

Alternatively, it is preferable that, in the object monitoring apparatus of the present invention, the pixel value correction section determines whether an edge is included in the second subregion and that, when the edge is included in the second subregion, executes correction in a manner that, where the average and variance of the pixel values in the second subregion inclusive of the first subregion in the event that either one pixel present in a position (x, y) in the comparison image or a set of plural pixels present in positions (x, y) when x, y is a variable are, respectively, represented by $E_1$ and $S_1^2$, the average and variance of the pixel values in the subregion corresponding to the second subregion of the reference image are, respectively, represented as $E_0$ and $S_0^2$, and when $$h(x, y) = \begin{cases} 1 & f_0(x, y) \geq E_0 \\ -1 & f_0(x, y) < E_0, \end{cases}$$

a pixel value $f_1(x, y)$ of the pixel present in the position (x, y) in the comparison image is corrected, in accordance with $$g(x, y) = \sqrt{\frac{S_0^2}{S_1^2}} h(x, y)(f_1(x, y) - E_1) + E_0 \quad (2)$$

to a post-correction pixel value g(x, y).

In this case, it may be that the pixel value correction section determines that the edge is included in the second subregion when the variance of the pixel values in the second subregion exceeds a predetermined threshold value.

Further, in the object monitoring apparatus of the present invention, it may be that the reference image and the comparison image are, respectively, color images where pixel values of plural colors are correlated to the respective pixels; the pixel value correction section executes the calculating operation for at least one color; and the change determination section determines the presence or absence of a change in the object by performing a comparison for at least one color between the reference image and the post-correction comparison image acquired through the pixel value correction section.

Alternatively, it is preferable that, in the object monitoring apparatus of the present invention, the reference image and the comparison image are, respectively, color images where plural color pixel values are correlated to the respective pixels; the pixel value correction section executes the calculating operation for respective ones of the plural colors; and the change determination section obtains distances of either mutually corresponding pixels or regions between the reference image and the post-correction comparison image acquired through the pixel value correction section and that determines the presence or absence of a change in the object in accordance with the distances.

Further, it is preferable that the object monitoring apparatus of the present invention includes, in a stage before the pixel value correction section, a misalignment correction section that corrects a positional misalignment and/or rotational misalignment between the reference image and the comparison image.

Further, an object monitoring program storage medium of the present invention to achieve the object stores an object monitoring program that is executed in an information processing apparatus and causes the information processing apparatus to operate as an object monitoring apparatus that monitors the presence or absence of a change in an object by performing a comparison between a reference image acquired by capturing the object and a comparison image acquired by capturing the object, the object monitoring program being characterized by causing the information processing apparatus to operate as the object monitoring apparatus including:

a pixel value correction section that causes an average and variance of pixel values in a second subregion inclusive of a first subregion inclusive of being formed of only one pixel in a comparison image resolved into plural pixels to match with an average and variance of pixel values in a subregion corresponding to the second subregion on a reference image similarly resolved into plural pixels, thereby to execute a calculating operation that corrects the pixel value of each pixel in the first subregion in the comparison image by recognizing each of plural subregions to be the first subregion, the plural subregions being obtained when the comparison image is divided into the plural subregions respectively inclusive of being formed of only one pixel; and a change determination section that determines the presence or absence of a change in the object by performing a comparison between the reference image and a post-correction comparison image acquired by being corrected in the pixel value correction section.

The object monitoring program storage medium of the present invention is characterized by storing the object monitoring program causing the information processing apparatus to operate as the object monitoring apparatus further comprising a differential calculating operation section that obtains a differential image formed from differentials between the pixel values of mutually corresponding pixels of the reference image and the post-correction comparison image acquired through the pixel value correction section, and the change determination section determines the presence or absence of a change in the object in accordance with the differential image acquired at the differential calculating operation section.

Further, in the object monitoring program storage medium of the present invention, it is preferable that the pixel value correction section executes the calculating operation by recognizing the respective one pixel forming the comparison image to be the first subregion.

Further, in the object monitoring program storage medium of the present invention, it may be that the pixel value correction section executes correction in a manner that, where the average and variance of the pixel values in the second subregion inclusive of the first subregion in the event that either one pixel present in a position (x, y) in the comparison image or a set of plural pixels present in positions (x, y) when x, y is a variable are, respectively, represented by $E_1$ and $S_1^2$, and the average and variance of the pixel values in the subregion corresponding to the second subregion of the reference image are, respectively, represented as $E_0$ and $S_0^2$, a pixel value $f_1(x, y)$ of the pixel present in the position (x, y) in the comparison image is corrected, in accordance with $$g(x, y) = \sqrt{\frac{S_0^2}{S_1^2}} (f_1(x, y) - E_1) + E_0 \tag{1}$$

to a post-correction pixel value g(x, y).

Alternatively, it is preferable that, in the object monitoring program storage medium of the present invention, the pixel value correction section determines whether an edge is included in the second subregion and that, when the edge is included in the second subregion, executes correction in a manner that, where the average and variance of the pixel values in the second subregion inclusive of the first subregion in the event that either one pixel present in a position (x, y) in the comparison image or a set of plural pixels present in positions (x, y) when x, y is a variable are, respectively, represented by $E_1$ and $S_1^2$, the average and variance of the pixel values in the subregion corresponding to the second subregion of the reference image are, respectively, represented as $E_0$ and $S_0^2$, and when $$h(x, y) = \begin{cases} 1 & f_0(x, y) \geq E_0 \\ -1 & f_0(x, y) < E_0, \end{cases}$$

a pixel value $f_1(x, y)$ of the pixel present in the position (x, y) in the comparison image is corrected, to a post-correction pixel value g(x, y) in accordance with $$g(x, y) = \sqrt{\frac{S_0^2}{S_1^2}} h(x, y)(f_1(x, y) - E_1) + E_0. \tag{2}$$

In this case, it may be that the pixel value correction section determines that the edge is included in the second subregion when the variance of the pixel values in the second subregion exceeds a predetermined threshold value.

Further, in the object monitoring program storage medium of the present invention, it may be that the reference image and the comparison image are, respectively, color images where pixel values of plural colors are correlated to the respective pixels; the pixel value correction section executes the calculating operation for at least one color; and the change determination section determines the presence or absence of a change in the object by performing a comparison for at least one color between the reference image and the post-correction comparison image acquired through the pixel value correction section.

Alternatively, it is preferable that, in the object monitoring program storage medium of the present invention, the reference image and the comparison image are, respectively, color images where plural color pixel values are correlated to the respective pixels; the pixel value correction section executes the calculating operation for respective ones of the plural colors; and the change determination section obtains distances of either mutually corresponding pixels or regions between the reference image and the post-correction comparison image acquired through the pixel value correction section and that determines the presence or absence of a change in the object in accordance with the distances.

Further, it is preferable that the object monitoring program storage medium of the present invention causes the information processing apparatus to operate as the object monitoring apparatus that further includes, in a stage before the pixel value correction section, a misalignment correction section that corrects a positional misalignment and/or rotational misalignment between the reference image and the comparison image.

As described above, according to the present invention, the presence or absence of a change in an object can be captured with high accuracy.

BRIEF DESCRIPTION OF THE DRAWINGS

FIG. 7 is a view showing pixel symbols of a binary image.

BEST MODE FOR CARRYING OUT THE INVENTION

An embodiment of the present invention will be described herebelow.

The embodiment described herebelow is an embodiment that realizes an object monitoring apparatus in a computer in the manner that an object monitoring program for realizing an object monitoring method of one embodiment of the present invention is executed in the computer.

The following describes hardware of the computer and then the program that is executed in the computer.

Figure 1:
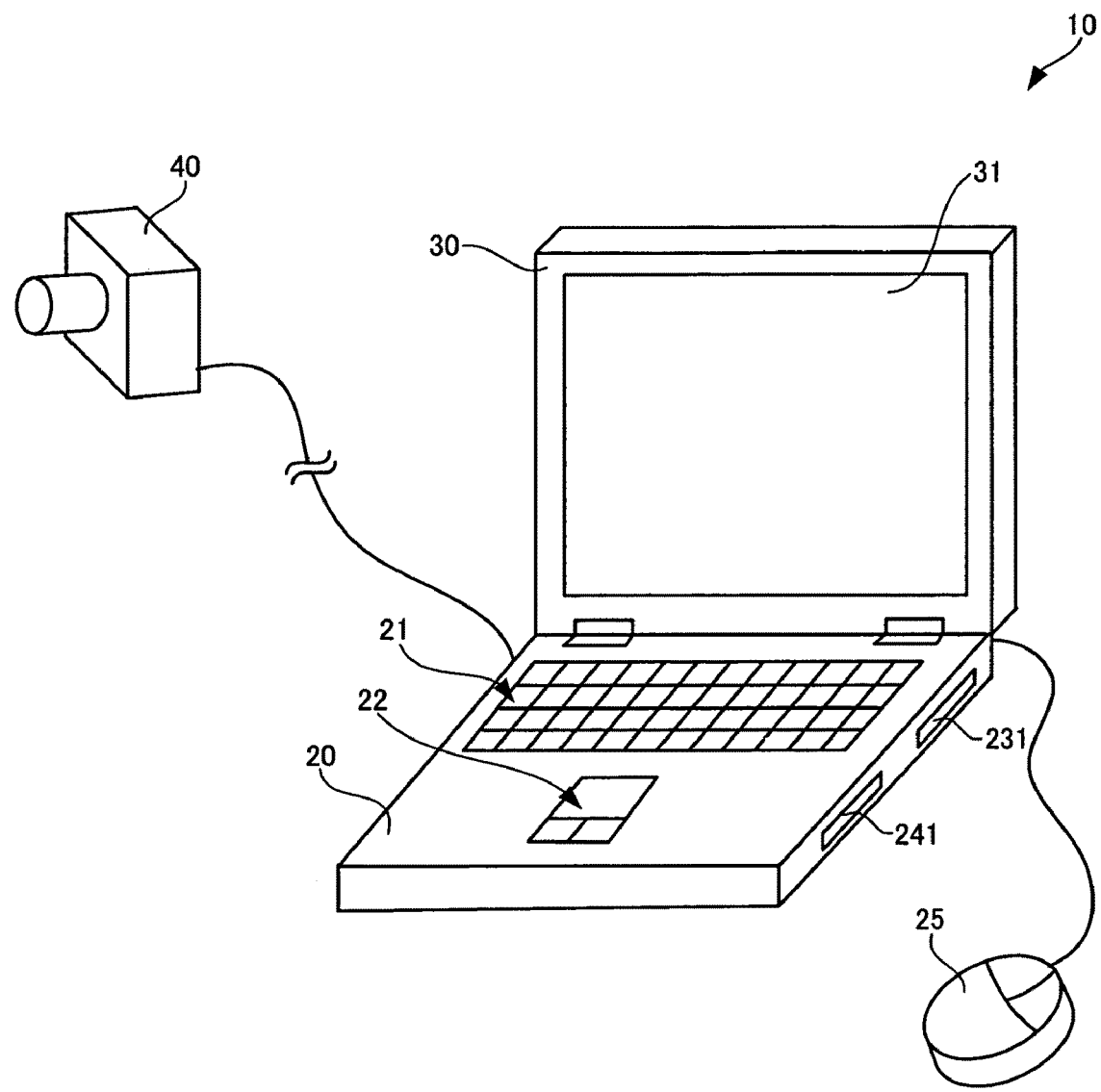
FIG. 1 is an exterior view of a notebook personal computer and a camera connected to the notebook personal computer.

FIG. 1 is an exterior view of a notebook personal computer (shortly "notebook PC," herebelow) and a camera connected to the notebook PC.

The notebook PC, 10, is configured to include a body section 20 and a display section 30 openable and closable with respect to the body section 20. On an upper face of the body section 20 there are provided, for example, a keyboard 21 that is key operated by a user and a trackpad 22 for specifying an arbitrary point on a display screen. In addition, as component sections shown in FIG. 1, an MO insertion slot 231 for insertion of an MO and a CD-R/RW insertion slot 241 for insertion of a CD-R or CD-RW are provided as sections shown in FIG. 1 in a lateral wall of the body section 20. In addition, a mouse 25 is connected to the body section 20, and is better in operability than the trackpad 22. Further, a camera 40 is connected to the body section 22. The camera 40 crops an object, which is a monitor target, into an image-capture range, performs image capture at a periodic time interval, every one minute for example, and sends or supplies image data acquired through the image capture to the body section 20 of the notebook PC. In the present embodiment, it is assumed that the camera 40 generates color image data respectively corresponding to the R (red), G (green), and B (blue) colors through image capture, and supplies the color image data to the body section 20 of the notebook PC.

Further, the display screen 31 extends in a central wide region of the display screen 31 of the notebook PC 10. The display section 30 is used by being opened as shown in FIG. 1, and after used, it is folded with the display screen 31 being internally faced in such a manner as to overlap with the upper face, on which the keyboard 21 and the like are disposed, of the body section 20.

Figure 2:
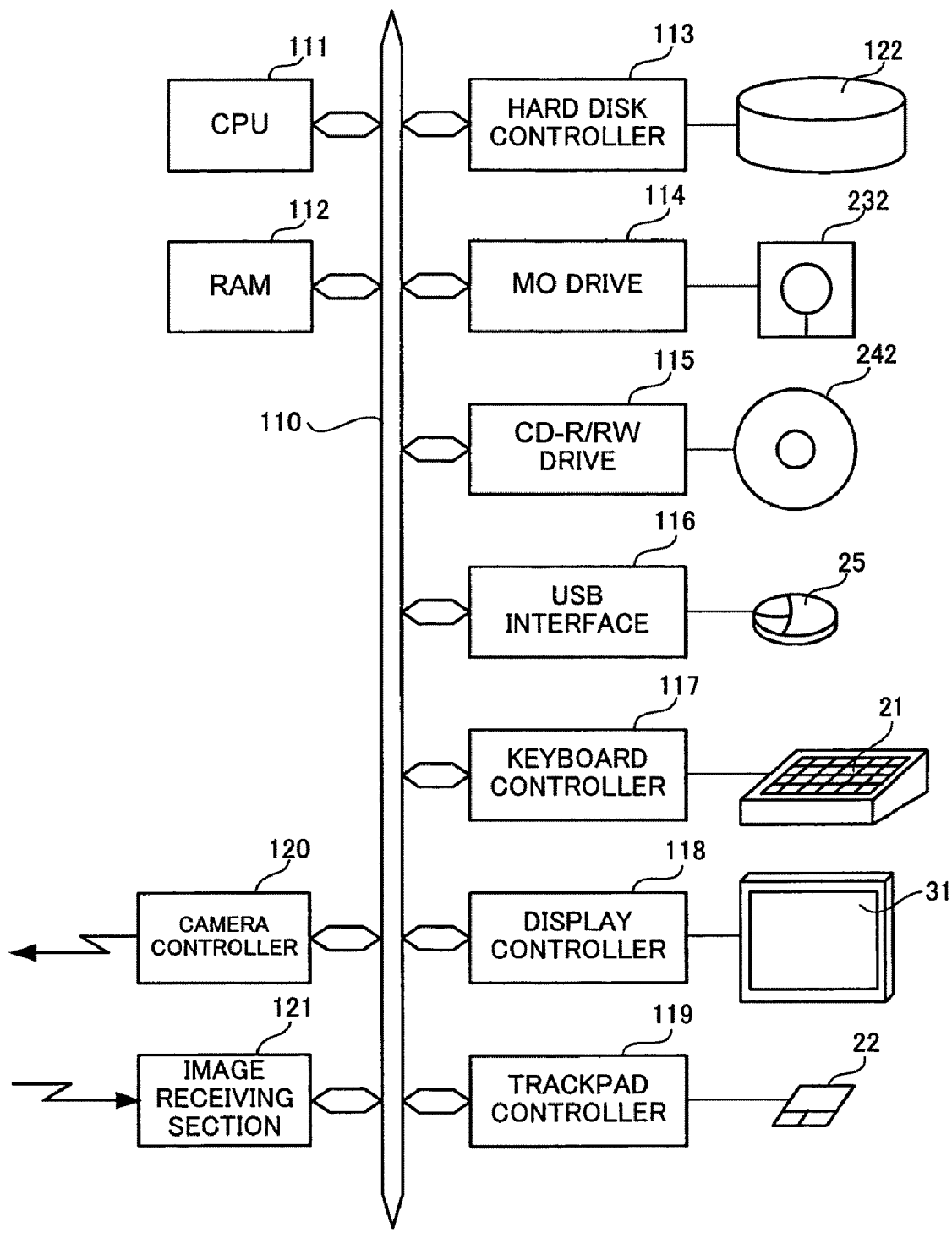
FIG. 2 is a hardware configuration diagram of the notebook personal computer shown in FIG. 1.

FIG. 2 is a hardware configuration diagram showing the notebook PC, of which the exterior is shown in FIG. 1.

The hardware configuration diagram of FIG. 2 shows a CPU 111, a RAM 112, a hard disk controller 113, an MO drive 114, a CD-R/RW drive 115, a USB interface 116, a keyboard controller 117, a display controller 118, a trackpad controller 119, a camera controller 120, and an image receiving section 121, and they are connected to one another via a bus 110.

The MO drive 114 and the CD-R/RW drive 115, respectively, access an MO 232 and a CD-R (or CD-RW) 242 inserted from the MO insertion slot 231 and the CD-R/RW insertion slot 241 that have been described above with reference to FIG. 1.

FIG. 2 further shows a hard disk 122 that is accessed by the hard disk controller 113. FIG. 2 further shows the mouse 25, the keyboard 21, the display screen 31, and the trackpad 22 that are also shown in FIG. 1. The hard disk controller 113, the USB interface 116, the keyboard controller 117, the display controller 118, and the trackpad controller 119, respectively, are used to control the hard disk 122, a USB standard compliant device (the mouse 25 in the present case), the keyboard 21, the display screen 31, and the trackpad 22.

Further, the camera controller 120 is connected to the camera 40 shown in FIG. 1, and is used to provide or issue image capture instructions at a periodic time interval (every one minute, for example) to the camera 40.

Further, also the image receiving section 121 is connected to the camera 40 shown in FIG. 1, and is used to receive image data acquired by the camera 40 and then supplied from the camera 40.

Figure 3:
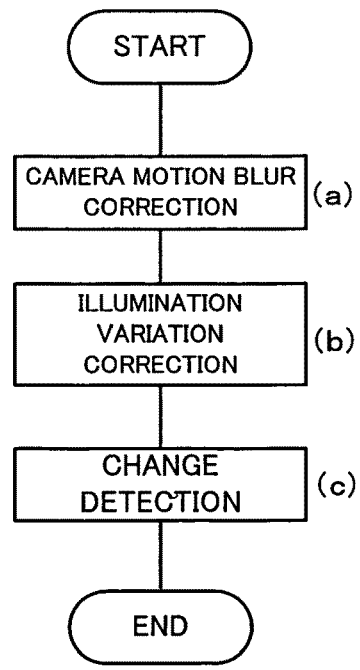
FIG. 3 is a flow chart of an object monitoring program that is executed in the notebook personal computer shown in FIGS. 1 and 2.

FIG. 3 is a flow chart of an object monitoring program that is executed in the notebook PC shown in FIGS. 1 and 2.

The object monitoring program is configured to include a camera motion blur correction step (step a), an illumination change correction step (step b), and an object change detection step (step c).

In this case, a comparison is performed between a reference image preliminarily captured by the camera 40 and a comparison image acquired by the camera 40 through the present image capture, thereby the presence or absence of a change in the object is detected at a time point of the image capture of the comparison image on the basis of a time point of the image capture of the reference image.

Figure 4:
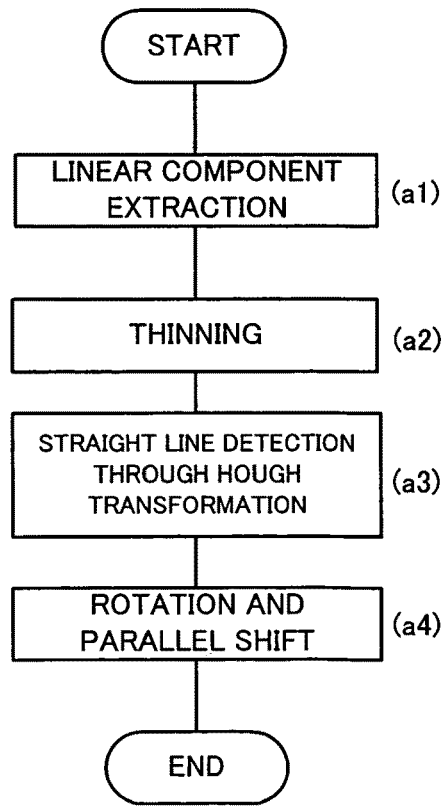
FIG. 4 is a detailed flow chart of a camera motion blur correction step (step a) of the object monitoring program shown in FIG. 3.

FIG. 4 is a detailed flow chart of a camera motion blur correction step (step a) of the object monitoring program shown in FIG. 3.

The camera motion blur correction step is a step necessary when there is a probability that image capture screens of the camera 40 (see FIG. 1) are displaced in the event that a reference image has acquired and in the event that a comparison image is acquired.

In the present case, respective processes, namely, a linear component extraction process (step a1), a thinning process (step a2), a straight line detection process (step a3) through the Hough transformation, and a rotation and parallel shifting process (step a4) are executed. The respective processes will be described one by one herebelow.

(Linear Component Extraction Process (Step a1))

In the present case, linear components of a reference image and a comparison image are detected through a Prewitt filter separately for horizontal components and vertical components.

The Prewitt filter is a feature extraction filter that seeks for a correlation value between a borderline shaped template and an image of interest. The configuration thereof is formed from two filters $\Delta X$ and $\Delta Y$.

$$\Delta X = \begin{bmatrix} -1 & 0 & 1 \\ -1 & 0 & 1 \\ -1 & 0 & 1 \end{bmatrix} \quad (10)$$

$$\Delta Y = \begin{bmatrix} -1 & -1 & -1 \\ 0 & 0 & 0 \\ 1 & 1 & 1 \end{bmatrix}$$

In this filter, only vertical edge components are extracted through $\Delta X$, and only horizontal edge components are extracted through $\Delta Y$. Although Equation (10) represents a 3×3 Prewitt filter, a short filter such as 3×5 Prewitt filter is used in a method of accurately extracting an edge, especially long horizontal or vertical edge.

By application of the Prewitt filter to the respective reference image and comparison image, a binary image from which linear components of the respective images have been extracted is acquired.

Figure 5:
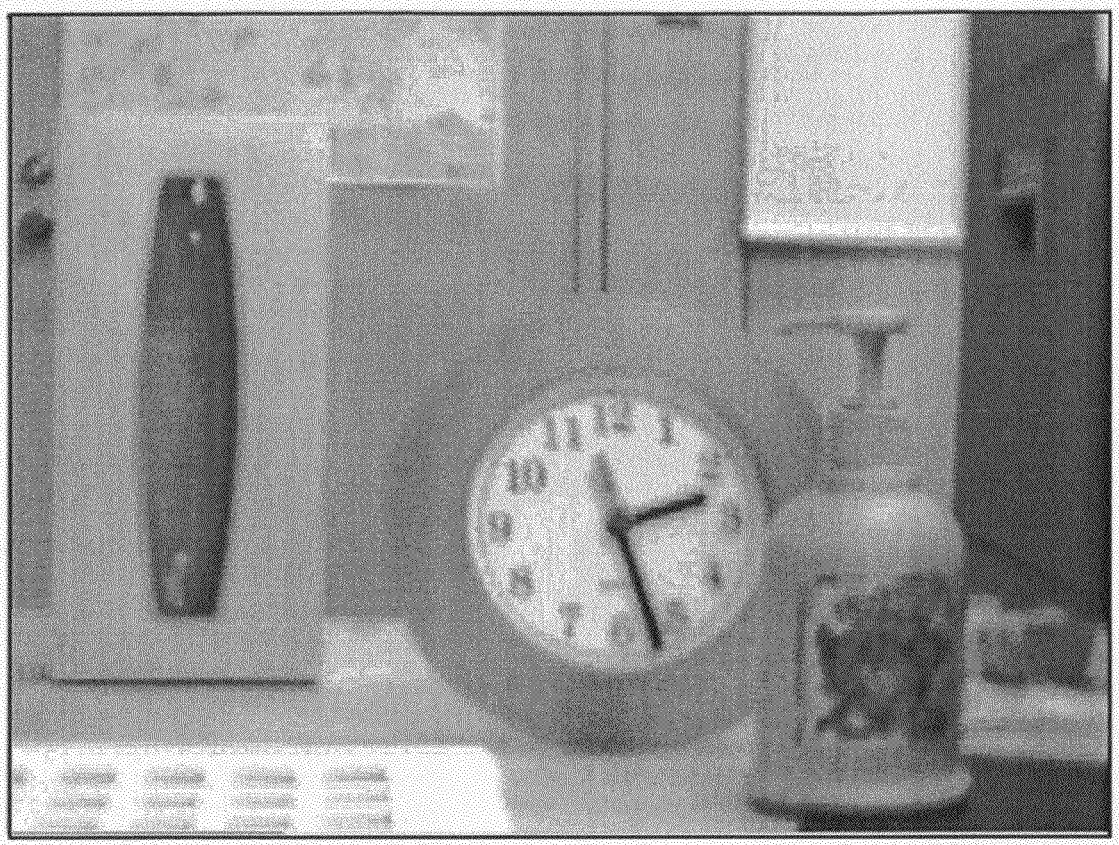
FIG. 5 is a view showing a source image (reference image or comparison image) before a Prewitt filter is applied.
Figure 6:
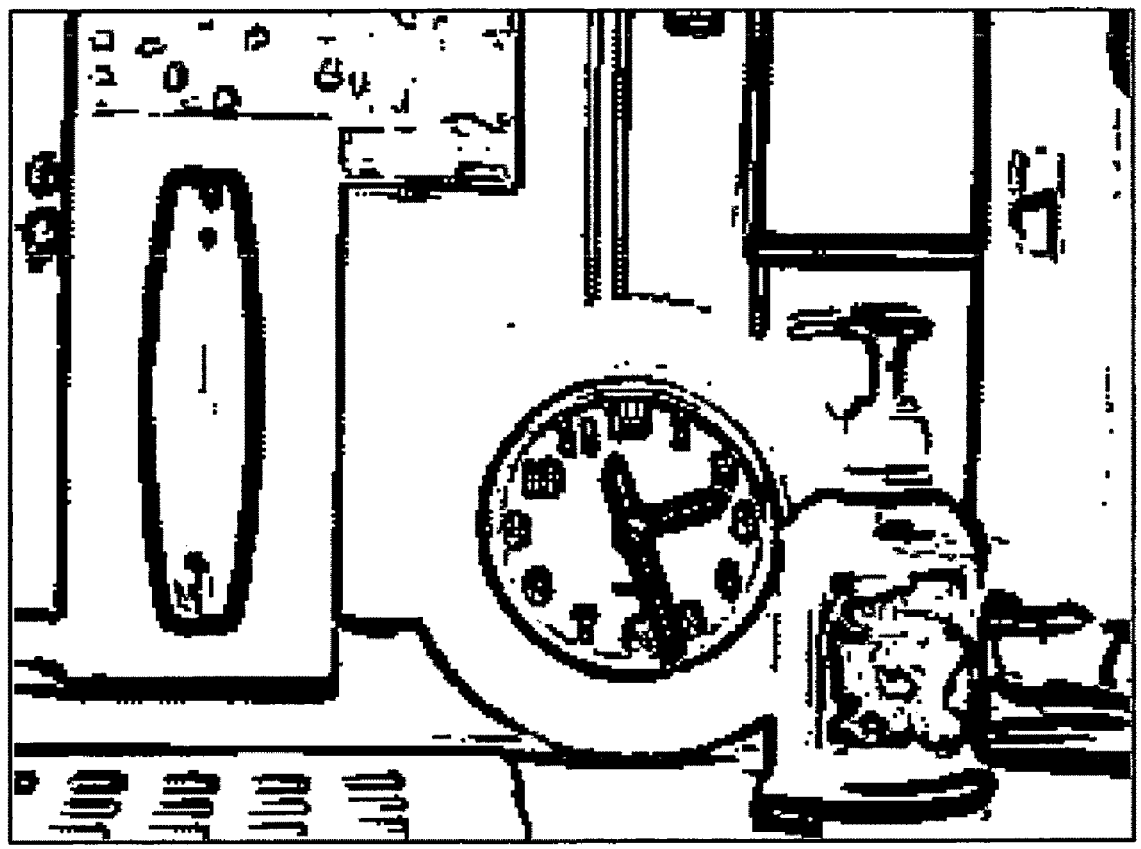
FIG. 6 is a view showing a binary image acquired as a result of application of the camera Prewitt filter to the source image shown in FIG. 5.

FIG. 5 is a view showing a source image (a reference image or a comparison image) before application of the Prewitt filter, and FIG. 6 is a view showing a binary image acquired as a result of application of the camera Prewitt filter to the source image shown in FIG. 5.

In the present case, while the Prewitt filter is employed, another linear component extraction filter, such as a Laplacian filter, may be employed in place of the Prewitt filter.

(Thinning Process (Step a2))

A binary image acquired by a filter, such as a Laplacian filter or Prewitt filter, has, generally, a width of an array of several pixels. Ideally, however, it is preferable that a contour line of an object has a width of one pixel. Processing of obtaining an image of a one-pixel linewidth from the line image is referred to as "thinning".

Figure 7:
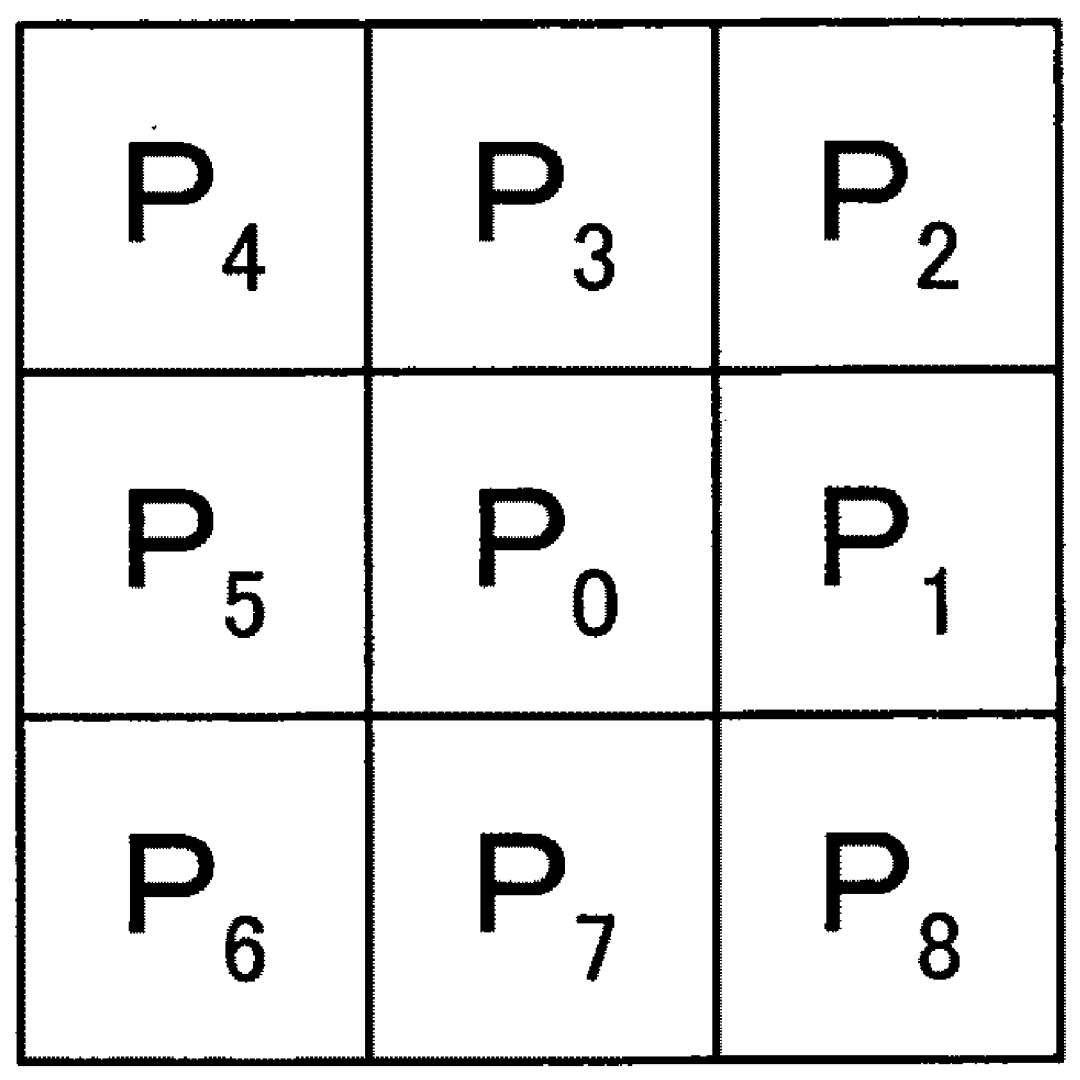

As shown in FIG. 7, of pixel symbols of the binary image to undergo thinning, the central pixel is represented by $p_0$ and neighbor pixels are each represented by $p_k$. As connectability with the neighbor pixels are taken into consideration, whether the central pixel is erasable can be determined by determining that the neighbor pixels correspond to which one of three patterns shown in FIG. 8 in the event that search is performed from the lower left to the upper right of the image. More specifically, where the respective black pixel is represented by 1 and the respective white pixel is represented by 0, in the event that a search is performed from the lower left to the upper right, a pixel satisfying one of conditions shown below, the pixel is erasable.

$$\begin{cases} p_2^* p_3^* p_4 = 1 \cap p_6 + p_7 + p_8 = 0 \\ p_1^* p_2^* p_3 = 1 \cap p_5 + p_6 + p_7 = 0 \\ p_8^* p_1^* p_2 = 1 \cap p_4 + p_5 + p_6 = 0 \end{cases} \quad (11)$$

Figure 8:
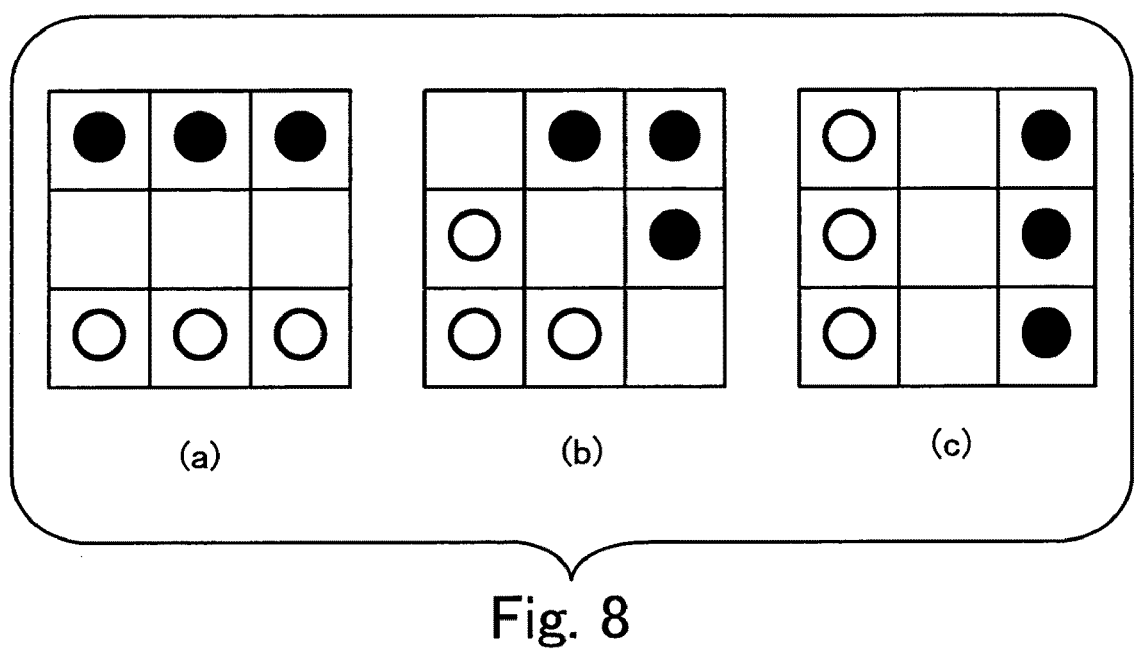
FIG. 8 is an explanatory view of a thinning process.

After completion of the search from the lower left to the upper right, a pixel determined to be erasable is erased. Then, a search initiation point is set to the upper right and the search direction is set to the direction to the lower left so that the patterns of the neighbor pixels shown in FIG. 8 are changed to the reversed patterns, thereby a search is performed again and a pixel is erased. Also when the search initiation point is either upper left or lower right, a similar procedure is applied to erase a pixel. This procedure is iterated until a pixel determined to be erasable does not remain, thereby the linewidth of the line image is made to one pixel, and the obtained line image becomes a center line when it has the width.

Figure 9:
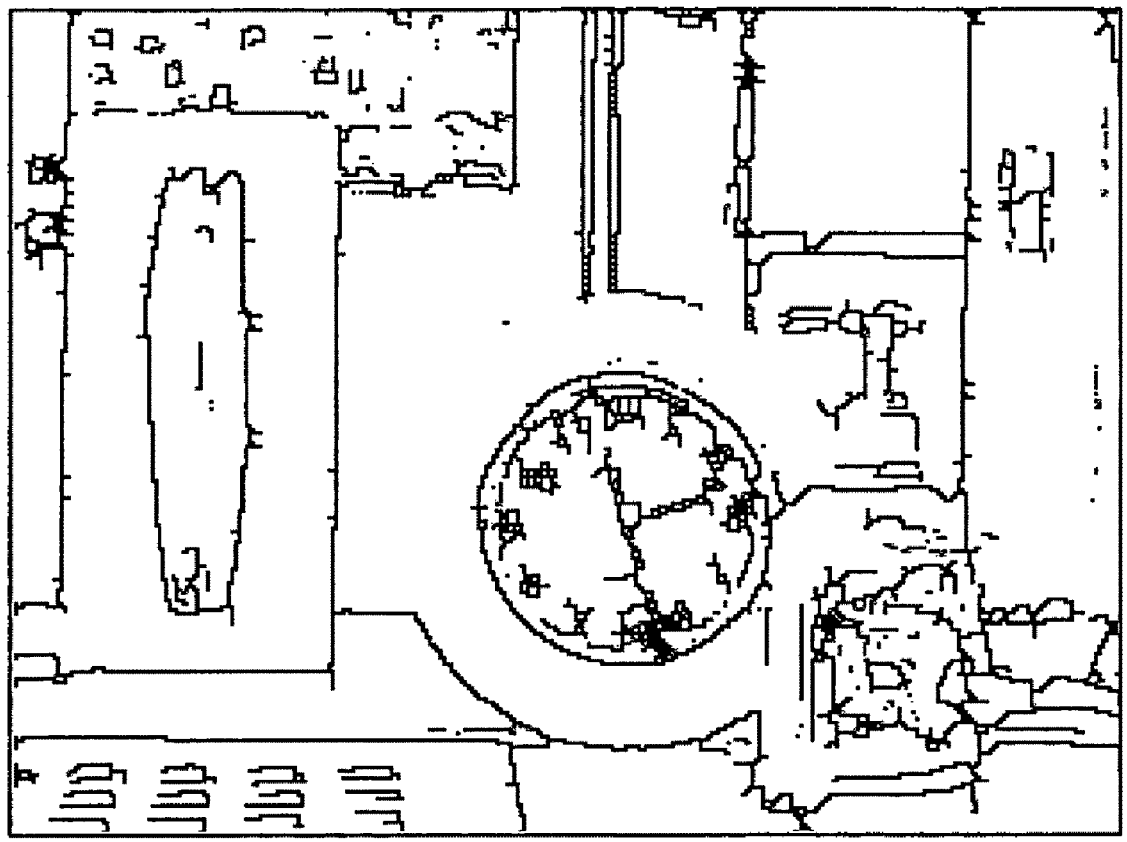
FIG. 9 is a view showing the result of thinning applied on FIG. 6.

FIG. 9 shows the result of thinning applied on FIG. 6.

(Straight Line Detection Process (Step a3) through Hough Transformation)

For recognizing the contour, it is important to obtain, for example, the information of the presence or absence and the position of a linear component from a line image obtained through filtering of the image. A representative scheme for extracting the straight line is the Hough transformation.

The Hough transformation is an effective scheme as a pattern extracting scheme for not only straight lines, but also parametric graphical patterns, such as circles and ellipsoids.

In the case of the straight line detecting Hough transformation, while a primary process thereof uses a (slope m)-(intercept c) coordinate system, the coordinate system of a θ-p regular expression is adaptable as an alternative to the m-c coordinate system for improving the detection accuracy. Further, enhancement is attempted toward the detection of various curve or curved line patterns and graphical patterns having arbitrary patterns.

A Hough transformation on a m-c parameter plane is given in accordance with Expression (12) shown below. It is carried out through the operation of a "point-line transformation". In the case that the image of interest is a binary image, the transformation shown in Expression (12) is performed for only the black pixels (n pieces) in the binary image.

$$s_i : c = -X_i \cdot m + Y_i \ (i=1,2,\ldots,n) \quad (12)$$

Figure 10:
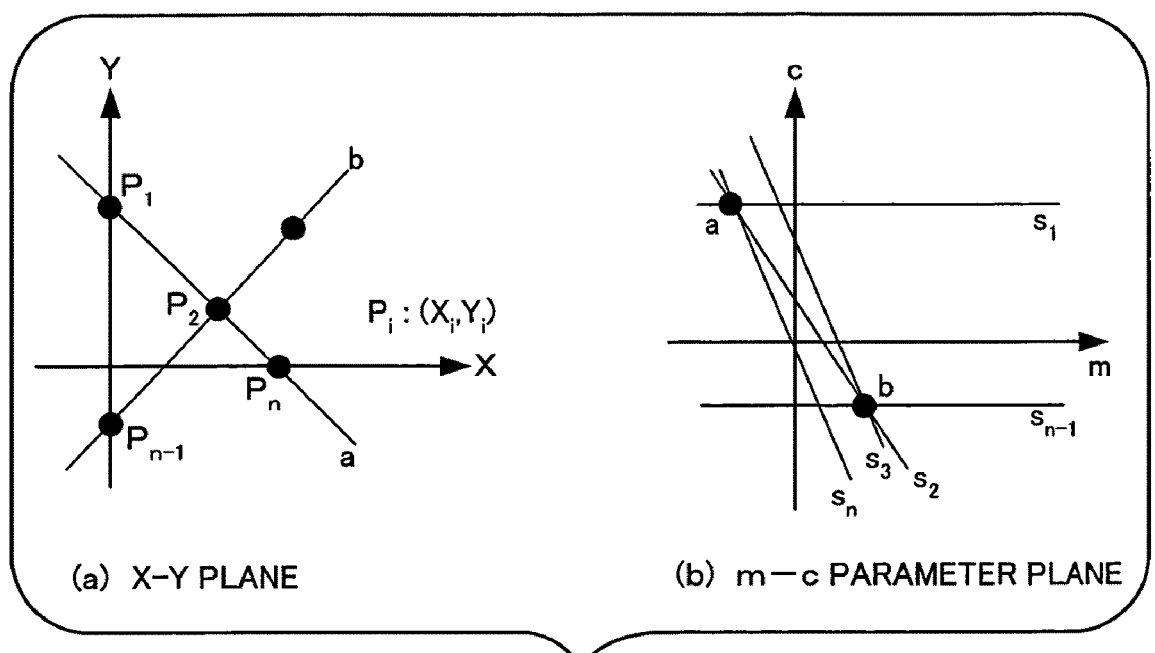
FIG. 10 is an explanatory view of a Hough transformation process.

More specifically, when trajectories on the m-c parameter plane, which are represented by Expression (12), are plotted or drawn over respective points $p_i(X_i, Y_i)$ shown in Part (a) of FIG. 10, the trajectories each result in one straight line $s_i$, as shown in Part (b) of FIG. 10.

Figure 11:
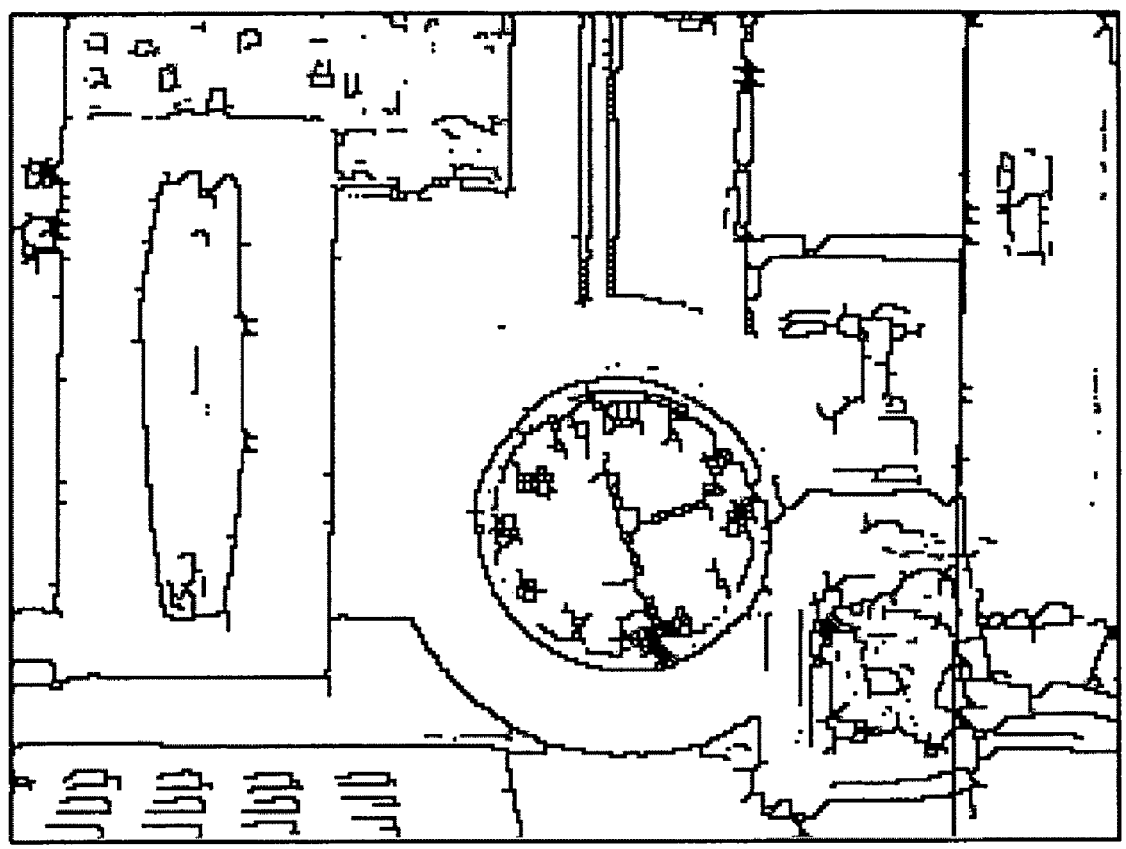
FIG. 11 is a view showing the result of detection of straight lines from FIG. 9.

FIG. 11 shows the result of detection of straight lines from FIG. 9.

Then, while the trajectories on the m-c parameter plane are being drawn over the respective black pixels on the X-Y plane, a cumulative frequency of the respective points on the parameter plane is obtained. More specifically, 1 is added to the cumulative frequency of the respective points on the parameter plane, which correspond to the straight lines corresponding to the respective black pixels on the X-Y plane, the cumulative frequency of the points, such as a point a and point b shown in Part (b) of FIG. 10, which correspond to the straight lines. As a result, the cumulative frequency has a large value. Consequently, the values of the slope and intercept of the respective straight line present in the binary image can be known in accordance with the value (m, c) that gives a relatively large value of the cumulative frequency.

(Rotation and Parallel Shifting Process (Step a4))

Figure 12:
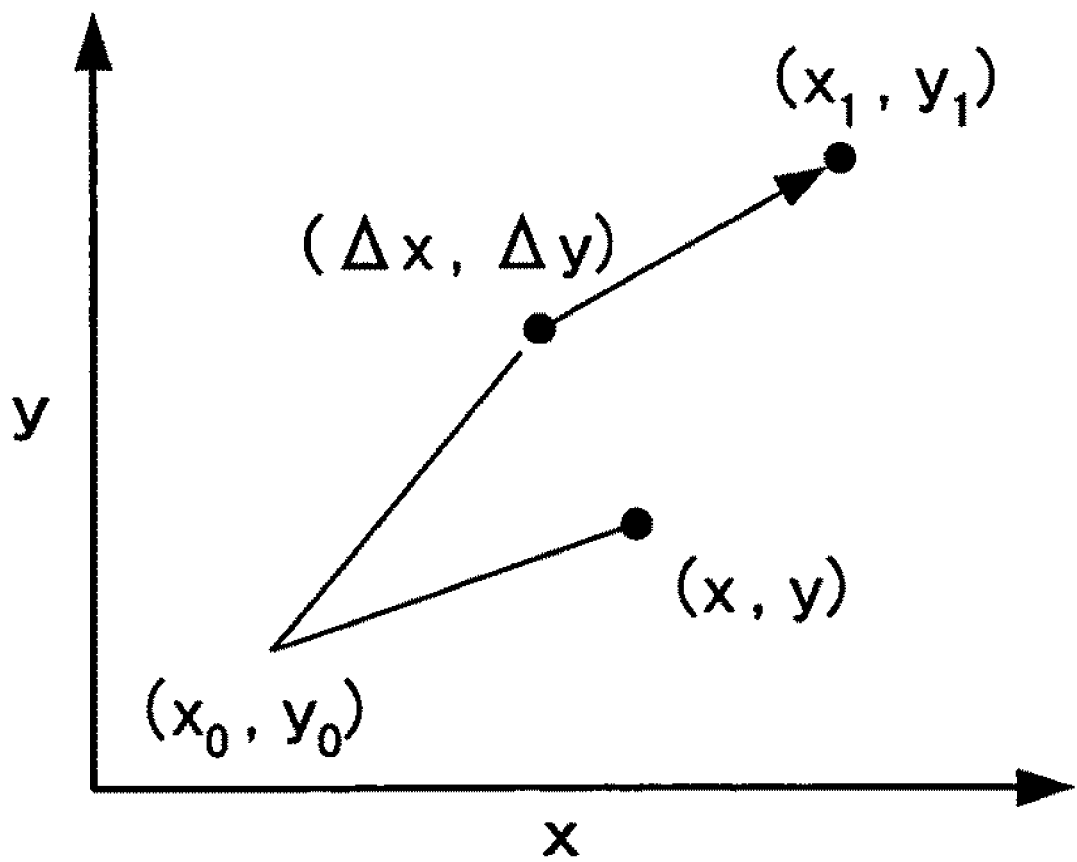
FIG. 12 is an explanatory view of a rotation and parallel shifting process.

The method of rotation and parallel shift of an image is carried out by rotating and parallel shifting position vectors of the respective pixels in the image. As shown in FIG. 12, an image is rotated about a point $(x_0, y_0)$ and is thereby parallel shifted along the x direction by $\Delta x$ and along the y-direction by $\Delta y$. Thereby, a pixel in a position $(x, y)$ in the image is shifted to a position $(x_1, y_1)$ in accordance with Expression (13).

$$\begin{pmatrix} x_1 \\ y_1 \end{pmatrix} = \begin{pmatrix} \cos\theta & -\sin\theta \\ \sin\theta & \cos\theta \end{pmatrix} \begin{pmatrix} x - x_0 \\ y_0 - y_0 \end{pmatrix} + \begin{pmatrix} x_0 + \Delta x \\ y_0 + \Delta y \end{pmatrix} \quad (13)$$

However, since pixel positions are discrete, an image after the shift is formed with a void due to a rounding error. As such, the operation can be performed such that the position $(x, y)$ in the source image to fit into the position $(x_1, y_1)$ after the shift is obtained, and a density value is obtained through the data interpolation of the source image. When Expression (13) is solved, the following result is obtained.

$$\begin{pmatrix} x \\ y \end{pmatrix} = \begin{pmatrix} \cos\theta & \sin\theta \\ -\sin\theta & \cos\theta \end{pmatrix} \begin{pmatrix} x_1 - x_0 - \Delta x \\ y_1 - y_0 - \Delta y \end{pmatrix} + \begin{pmatrix} x_0 \\ y_0 \end{pmatrix} \quad (14)$$

Figure 13:
FIG. 13 is a view showing the result of rotation/parallel shift of FIG. 5.

FIG. 13 shows an image obtained in the manner that the image of FIG. 5 is rotated 10° about the lower left and is parallel shifted rightward by 10 pixels and downward by 20 pixels.

Thus, the comparison image is parallel shifted and rotated relative to the reference image such that the extracted straight lines most accurately match in accordance with the process described above. Thereby, two images can be aligned with one another with high accuracy.

Figure 14:
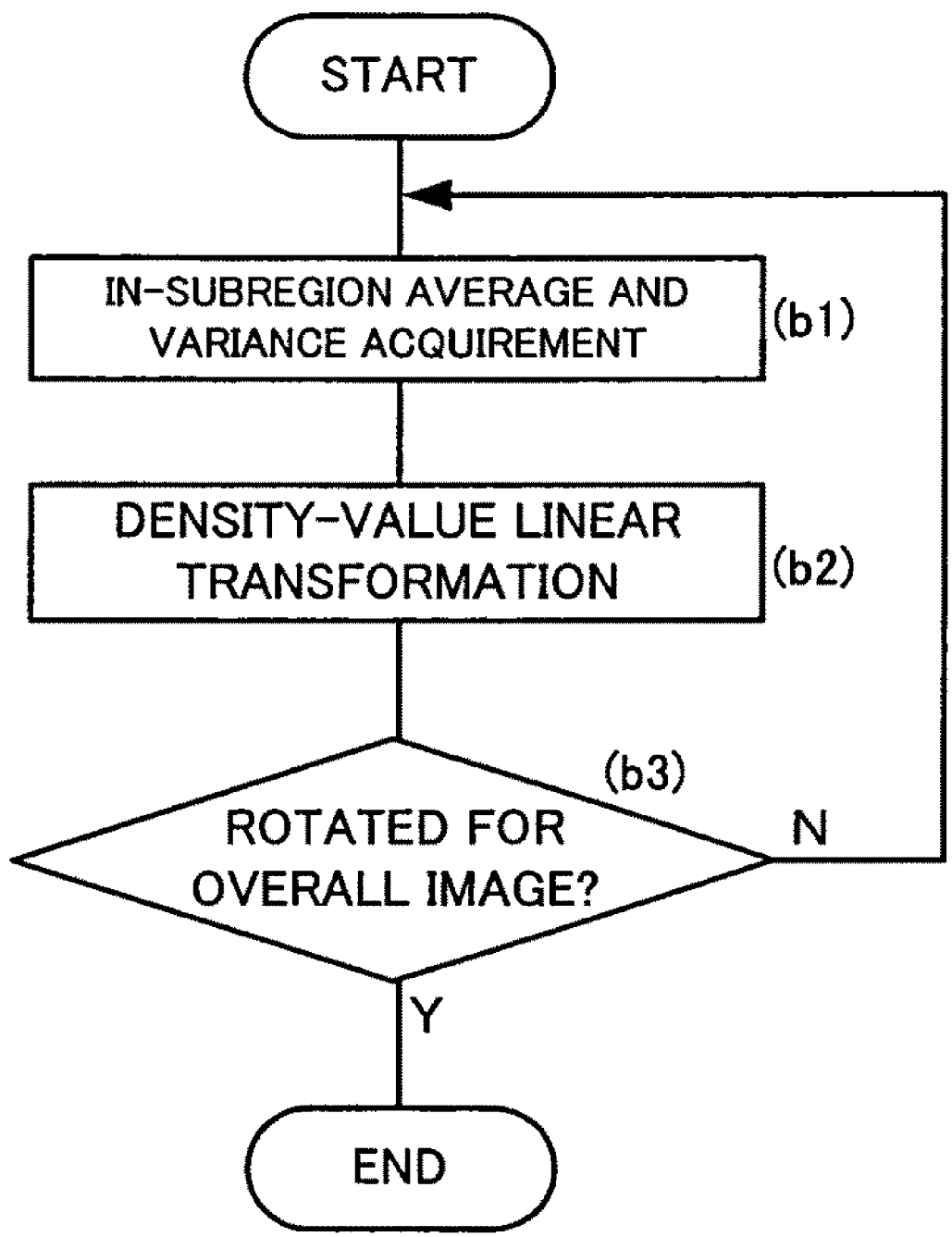
FIG. 14 is a detailed flow chart of an illumination change correction step (step b) of the object monitoring program shown in FIG. 3.

FIG. 14 is a detailed flow chart of the illumination change correction step (step b) of the object monitoring program shown in FIG. 3.

In this case, an in-subregion average and variance acquiring process (step b1) and a density-value linear transformation process (step b2) are performed for the overall image (step b3).

(In-Subregion Average and Variance Acquiring Process (Step b1))

Here in the present case, n×n subregions are first extracted from identical positions in the reference image and the comparison image, and averages and variances in the subregions are obtained.

Figure 15:
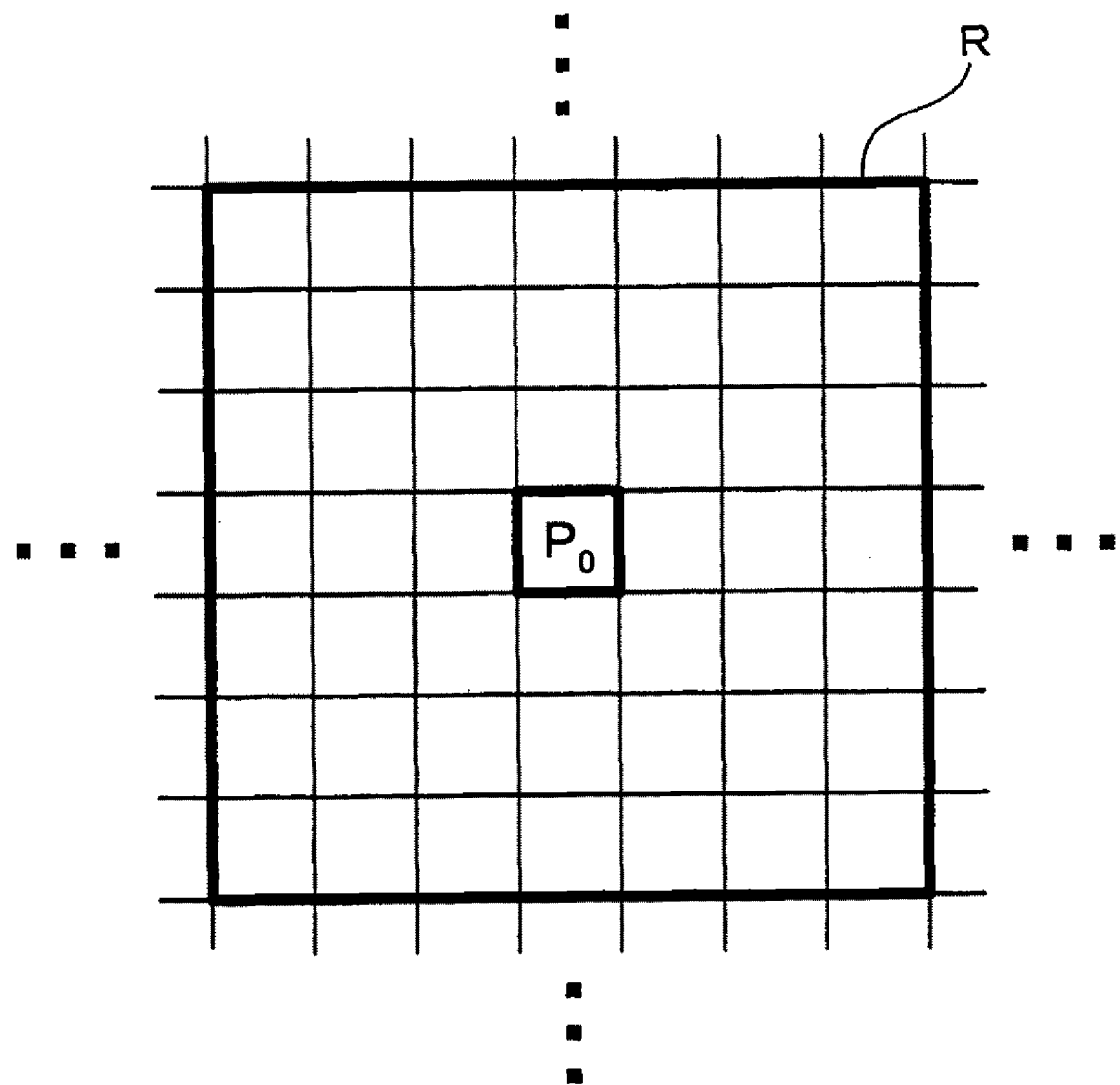
FIG. 15 is a view showing a subregion R of a part of the respective image (reference image, comparison image).

FIG. 15 is a view showing a subregion R of a part of the image (the reference image, the comparison image). The subregion R corresponds to an example of a second subregion defined in the present invention. In the present case, by way of one example, the subregion R is configured from 7×7 pixels about a pixel $P_0$. In the present case, the average and variance in each of the reference image and the comparison image are obtained.

In the present case, the average and variance obtained from the reference image are, respectively, represented by $E_0$ and $S_0^2$, and the average and variance obtained from the comparison image are, respectively, represented by $E_1$ and $S_1^2$. Further, it is represented that the coordinate of the central pixel $P_0$ of the subregion R is represent $(x, y)$, and the density value of the pixel $P_0$ is $f_1(x, y)$.

(Density-Value Linear Transformation Process (Step b2))

In the present case, as in the manner described above, after the average and variance of each of the reference image and the comparison image have been obtained, the density value $f_1(x, y)$ of the central pixel $P_0$ of the subregion R of the comparison image is linearly transformed to a post-correction or corrected density value $g(x, y)$ in accordance with Expression (1).

$$g(x, y) = \sqrt{\frac{S_0^2}{S_1^2}} (f_1(x, y) - E_1) + E_0 \quad (1)$$

In the present case, while the subregion R about the respective central pixel $P_0$ is being serially shifted, two steps b1 and b2 are iterated. Thereby, a comparison image in which the density values of the respective pixels are linearly transformed is obtained.

Figure 16:
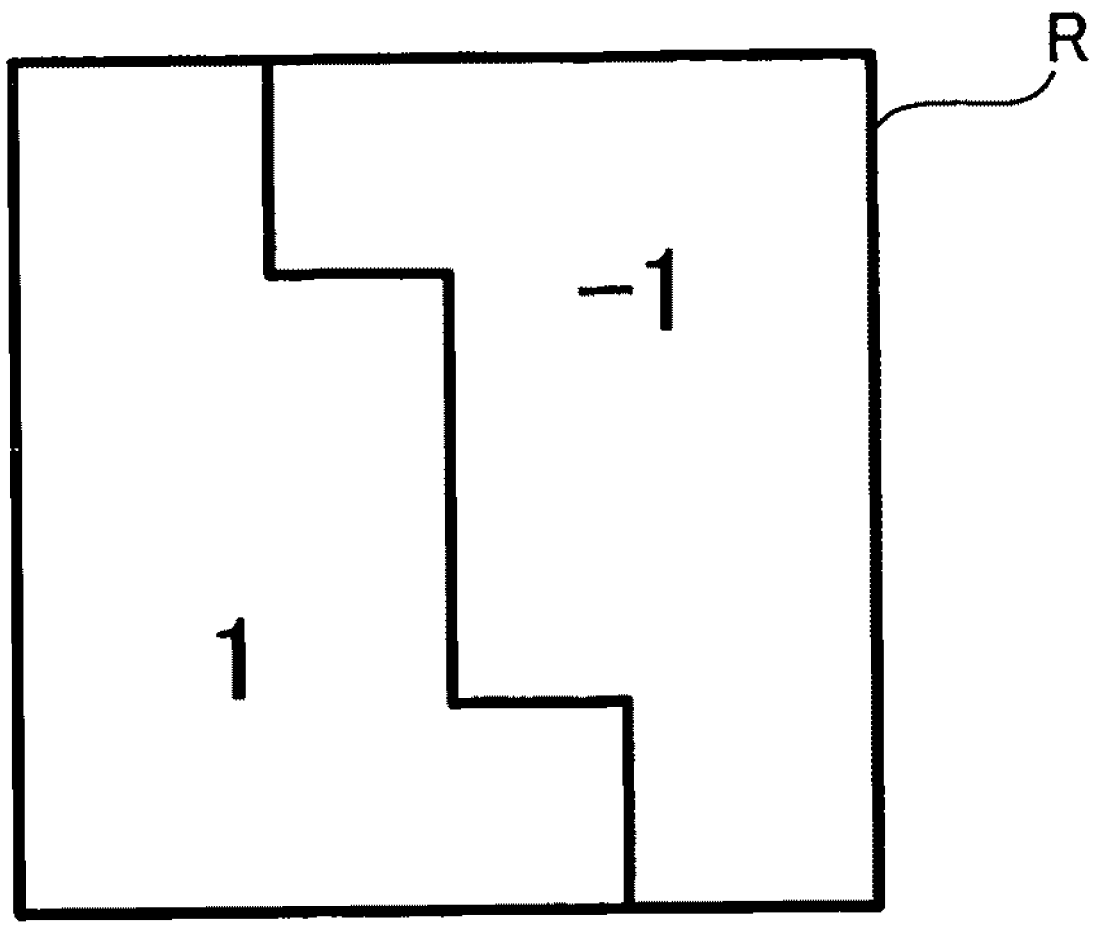
FIG. 16 is a view showing a region in which value "1" or "−1" is allocated to the respective pixel in the subregion R.
Figure 17:
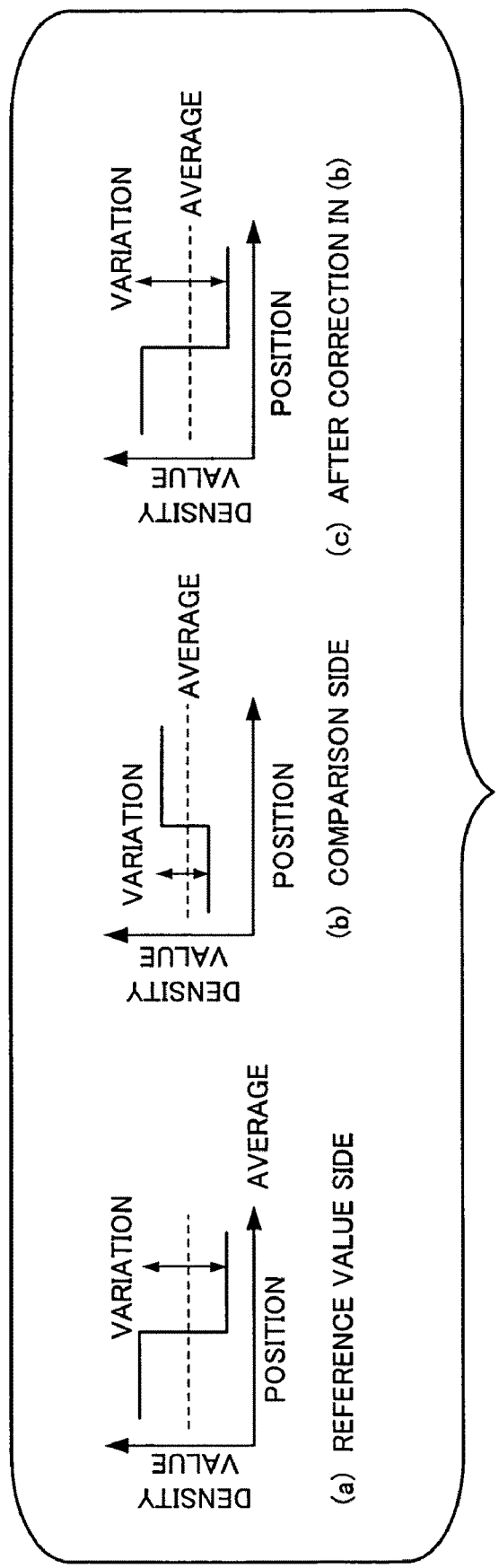
FIG. 17 is an explanatory view showing a correction process of a density value of a subregion including edges.

Then, the density value correction process in the event that a comparative high or low relationship of edge border density values is inversed due to an illumination change will be described herebelow. In this case, however, when correction is performed only for the average and variance of the density values, the comparative high or low relationship of the edge border density values is not corrected. Consequently, a good result cannot be obtained. In order to implement such correction, when it can be determined that an edge is included in a subregion R on the side of the comparison image, information indicative of whether the density values of the respective pixels are higher or lower than the average in the subregion R is, as shown in FIG. 16, preliminarily acquired in the form of 1 or −1. Then, as shown in Expression (2), when the density value $f_1(x, y)$ of the position x, y on the side of the comparison image is corrected to the post-correction density value $g(x, y)$, the reference value is met (FIG. 17).

More specifically, in the present case, where the density value of each pixel (coordinate $(x, y)$ ($x, y$ is a variable)) in the subregion of the reference image is $f_0(x, y)$, $$h(x, y) = \begin{cases} 1 & f_0(x, y) \geq E_0 \\ -1 & f_0(x, y) < E_0 \end{cases}$$

is used.

And in accordance with $$g(x, y) = \sqrt{\frac{S_0^2}{S_1^2}} h(x, y)(f_1(x, y) - E_1) + E_0, \quad (2)$$

the post-correction density value $g(x, y)$ can be obtained.

Figure 18:
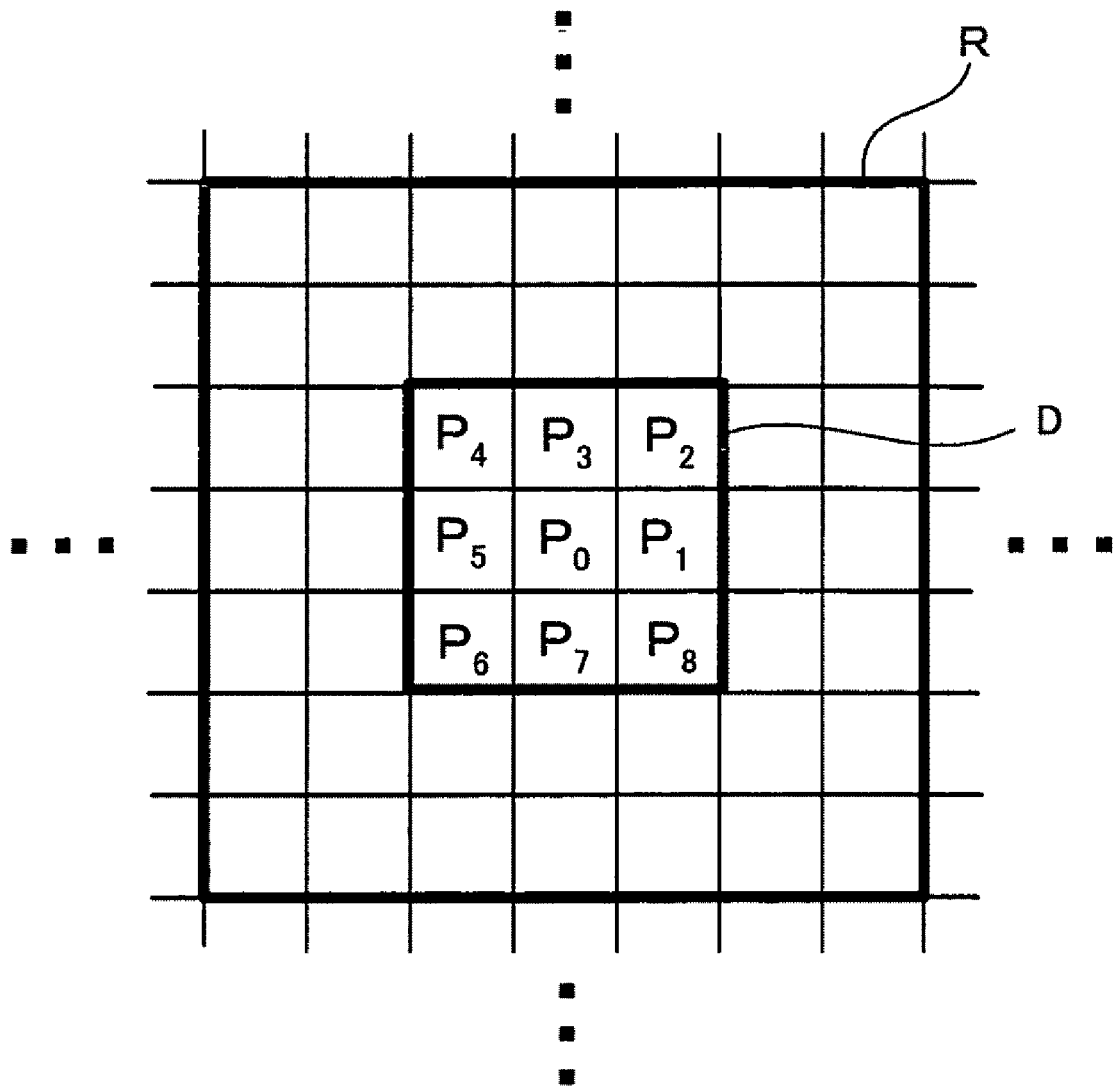
FIG. 18 is an explanatory view showing a modified example of density value linear correction.

FIG. 18 is an explanatory view showing a modified example of the density value linear correction.

In the present case, density values of respective pixels $P_0$ to $P_8$ in another subregion D in a central portion of the subregion R are corrected in accordance with the average and variance in the subregion R. In this event, the coordinate $(x, y)$ of the respective pixel in the subregion D is considered to be the variable, the Expression (1) or (2) as it is can be applied.

In this case, when only the density value of one central pixel $P_0$ is corrected in accordance with the average and variance in the subregion R, high accuracy correction can be implemented. Alternately, when the density value of the respective pixels in the central subregion D configured from the multiple pixels are corrected in accordance with the average and variance in the subregion R, high speed correction can be implemented.

Figure 19:
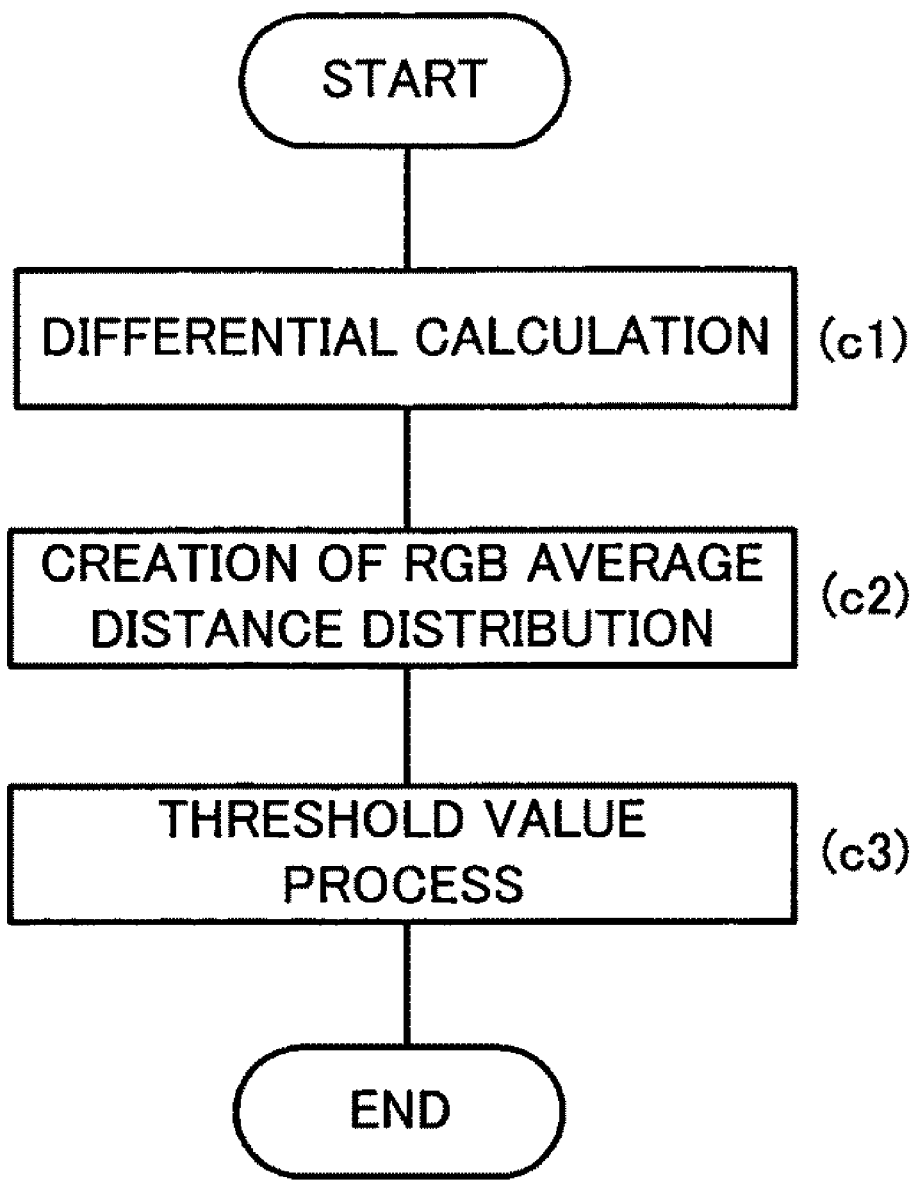
FIG. 19 is a detailed flow chart of an illumination change detection step (step c) of the object monitoring program shown in FIG. 3.

FIG. 19 is a detailed flow chart of the change detection step (step c) of the object monitoring program shown in FIG. 3.

First, in the present case, a differential image between a reference image and a comparison image in which density values are corrected in the manner as described above is obtained, thereby to acquire the image of an extracted change between the images (step c1).

Then, an average distance in the RGB space of peripheral n pixels for each pixel of the differential image is calculated, thereby creating an average distance distribution of the entirety of the differential image (step c2).

A threshold value T is determined in accordance with Expression (15) from an average value E and a standard deviation σ of the obtained average distance distribution.

$$T = E + 3\sigma \quad (15)$$

Portions having the respective average distances greater than the threshold value T are detected as changed portions (step c3). In the present case, while Expression (15) is thus employed as the threshold value T, the width of T (3 of 3σ in Equation (15)) is appropriately adjusted.

Figure 20:
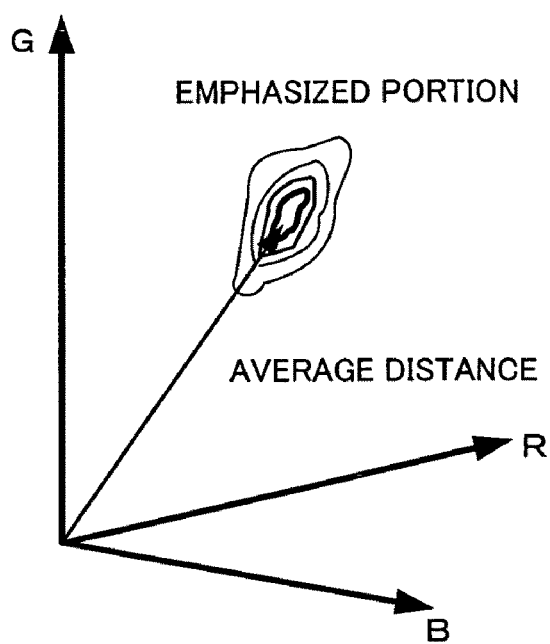
FIG. 20 is a view showing characteristics of a portion (emphasized portion) indicative of a large change between the reference image and the comparison image.

FIG. 20 shows characteristics of a portion (emphasized portion of a differential image) having a large change between the reference image and the comparison image. There is indicated that as the average distance is larger, the change is proportionally greater (emphasized).

Figure 21:
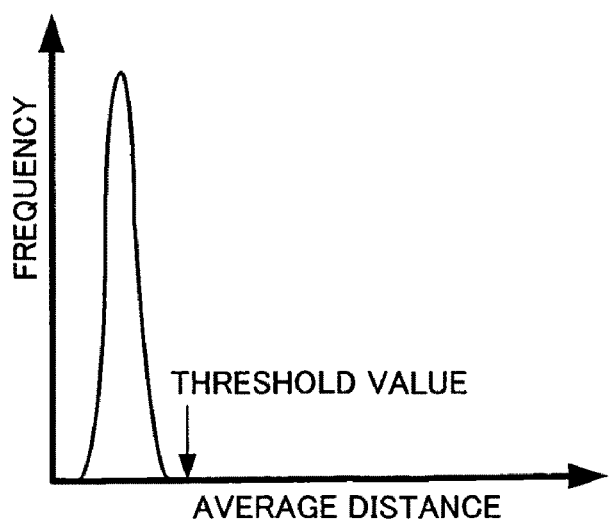
FIG. 21 is a view showing an average distance distribution across the overall image.

Further, FIG. 21 shows an average distance distribution across the overall image. With detection of respective portions having average distances greater than the threshold value, it is detected that the comparison image has changed from the reference image (that is, the change has occurred in the object).

Occurrence of the change in the object is displayed on the display screen 31 of the notebook PC 10 shown in FIG. 1. In addition, attention may be attracted by using, for example, a buzzer or lamp.

In the present embodiment, among steps a to c shown in FIG. 3, at steps a and b the process is executed for the respective image data of R, G, and B, and at step c the process for obtaining the differential image is executed for the respective image data of R, G, and B. Thereafter, the average distance is obtained by summing the respective data of R, G, and B, and the presence or absence of the change in the object is determined in accordance with the average distance. However, in a case where, for example, an object change in the G color is preliminarily known to occur with high degree, the process can be executed only on the G image data at any one of steps a to c shown in FIG. 3. In this case, the presence or absence of the object change is determined only for the density value of G of the differential image.

Further, in the present case, a differential image is obtained, and the presence or absence of an object change is determined in accordance with the differential image. In this case, however, an operation to indicate a "difference" between the reference image and the post-correction comparison image can be executed, so that no limitation is imposed on the narrow-sense word "differential".

Further, in a case where the camera is securely fixed to the extent that the positional relationship with an object is not variable, step a shown in FIG. 3 can be omitted.

In the present case, while the apparatus of the type configured from the notebook PC and the camera connected to the notebook PC shown in FIG. 1 is employed, the present invention is not limited to the apparatus of that type. For example, any one of, for example, apparatuses of the types employing a desktop personal computer and configured integrally with a camera can be employed.

Further, also the interior configuration of the apparatus shown in FIG. 2 is not limited to the configuration shown in FIG. 2, but a different configuration in which, for example, the MO is not used, may be employed.

What is claimed is:

1. An object monitoring method performed by a computer for monitoring the presence or absence of a change in an object by performing a comparison between a reference image acquired by capturing the object at a first time and a comparison image acquired by capturing the object at a second time, the object monitoring method comprising:

a pixel value correction step, performed by a processor, that causes an average and variance of pixel values of pixels in a second subregion, inclusive of a first subregion formed of one or more pixels, in the comparison image resolved into a plurality of pixels to match with an average and variance of pixel values in a subregion corresponding to the second subregion on the reference image similarly resolved into a plurality of pixels, thereby to execute a calculating operation that corrects the pixel value of each pixel in the first subregion in the comparison image by recognizing each of a plurality of subregions to be the first subregion, the plurality of subregions being obtained when the comparison image is divided into the plurality of subregions respectively inclusive of being formed of only one pixel; and a change determination step that determines the presence or absence of a change in the object by performing a comparison between the reference image and a post-correction comparison image acquired through the pixel value correction step, wherein the pixel value correction step is a step that executes correction in a manner that, where the average and variance of the pixel values in the second subregion inclusive of the first subregion in the event that either one pixel present in a position (x, y) in the comparison image or a set of plural pixels present in positions (x, y) when x, y is a variable are, respectively, represented by $E_1$ and $S_1^2$, and the average and variance of the pixel values in the subregion corresponding to the second subregion of the reference image are, respectively, represented as $E_0$ and $S_0^2$, a pixel value $f_2(x, y)$ of the pixel present in the position (x, y) in the comparison image is corrected to a post-correction pixel value g(x, y) in accordance with $$g(x, y) = \sqrt{\frac{S_0^2}{S_1^2}} (f_1(x, y) - E_1) + E_0. \quad (1)$$

2. The object monitoring method according to claim 1, further comprising a differential calculating operation step that obtains a differential image formed from differentials between the pixel values of mutually corresponding pixels of the reference image and the post-correction comparison image acquired through the pixel value correction step, wherein the change determination step is a step that determines the presence or absence of a change in the object in accordance with the differential image acquired at the differential calculating operation step.

3. The object monitoring method according to claim 1, wherein the pixel value correction step is a step that executes the calculating operation by recognizing the respective one pixel forming the comparison image to be the first subregion.

4. The object monitoring method according to claim 1, wherein the average and variance of the pixel values in the subregion corresponding to the second subregion of the reference image are, respectively, represented as $E_0$ and $S_0^2$, when $$h(x, y) = \begin{cases} 1 & f_0(x, y) \geq E_0 \\ -1 & f_0(x, y) < E_0, \end{cases}$$

5. The object monitoring method according to claim 4, wherein the pixel value correction step is a step that determines that the edge is included in the second subregion when the variance of the pixel values in the second subregion exceeds a predetermined threshold value.

6. The object monitoring method according to claim 1, wherein the reference image and the comparison image are, respectively, color images where pixel values of a plurality of colors are correlated to the respective pixels; the pixel value correction step is a step that executes the calculating operation for at least one color; and the change determination step is a step that determines the presence or absence of a change in the object by performing a comparison for at least one color between the reference image and the post-correction comparison image acquired through the pixel value correction step.

7. The object monitoring method according to claim 1, wherein the reference image and the comparison image are, respectively, color images where pixel values of a plurality of colors are correlated to the respective pixels; the pixel value correction step is a step that executes the calculating operation for respective ones of the plurality of colors; and the change determination step is a step that obtains distances in color space between either mutually corresponding pixels or regions between the reference image and the post-correction comparison image acquired through the pixel value correction step and that determines the presence or absence of a change in the object in accordance with the distances.

8. The object monitoring method according to claim 1, further comprising a misalignment correction step that corrects a positional misalignment and/or rotational misalignment between the reference image and the comparison image, the misalignment correction being executed before the pixel value correction step.

9. An object monitoring apparatus for monitoring the presence or absence of a change in an object by performing a comparison between a reference image acquired by capturing the object at a first time and a comparison image acquired by capturing the object at a second time, the object monitoring apparatus comprising:

a pixel value correction section that causes an average and variance of pixel values of pixels in a second subregion, inclusive of a first subregion formed of one or more pixels, in the comparison image resolved into a plurality of pixels to match with an average and variance of pixel values in a subregion corresponding to the second subregion on the reference image similarly resolved into a plurality of pixels, thereby to execute a calculating operation that corrects the pixel value of each pixel in the first subregion in the comparison image by recognizing each of a plurality of subregions to be the first subregion, the plurality of subregions being obtained when the comparison image is divided into the plurality of subregions respectively inclusive of being formed of only one pixel; and a change determination section that determines the presence or absence of a change in the object by performing a comparison between the reference image and a post-correction comparison image acquired by being corrected in the pixel value correction section, wherein the pixel value correction section executes correction in a manner that, where the average and variance of the pixel values in the second subregion inclusive of the first subregion in the event that either one pixel present in a position (x, y) in the comparison image or a set of a plurality of pixels present in positions (x, y) when x, y is a variable are, respectively, represented by $E_1$ and $S_1^2$ and the average and variance of the pixel values in the subregion corresponding to the second subregion of the reference image are, respectively, represented as $E_0$ and $S_0^2$, a pixel value $f_1(x, y)$ of the pixel present in the position (x, y) in the comparison image is corrected to a post-correction pixel value $g(x, y)$ in accordance with $$g(x, y) = \sqrt{\frac{S_0^2}{S_1^2}} (f_1(x, y) - E_1) + E_0. \tag{1}$$

10. The object monitoring apparatus according to claim 9, further comprising a differential calculating operation section that obtains a differential image formed from differentials between the pixel values of mutually corresponding pixels of the reference image and the post-correction comparison image acquired through the pixel value correction section, wherein the change determination section determines the presence or absence of a change in the object in accordance with the differential image acquired at the differential calculating operation section.

11. The object monitoring apparatus according to claim 9, wherein the pixel value correction section executes the calculating operation by recognizing the respective one pixel forming the comparison image to be the first subregion.

12. The object monitoring apparatus according to claim 9, wherein the average and variance of the pixel values in the subregion corresponding to the second subregion of the reference image are, respectively, represented as $E_0$ and $S_0^2$, when $$h(x, y) = \begin{cases} 1 & f_0(x, y) \geq E_0 \\ -1 & f_0(x, y) < E_0, \end{cases}$$

13. The object monitoring apparatus according to claim 12, wherein the pixel value correction section determines that the edge is included in the second subregion when the variance of the pixel values in the second subregion exceeds a predetermined threshold value.

14. The object monitoring apparatus according to claim 9, wherein the reference image and the comparison image are, respectively, color images where pixel values of a plurality of colors are correlated to the respective pixels; the pixel value correction section executes the calculating operation for at least one color; and the change determination section determines the presence or absence of a change in the object by performing a comparison for at least one color between the reference image and the post-correction comparison image acquired through the pixel value correction section.

15. The object monitoring apparatus according to claim 9, wherein the reference image and the comparison image are, respectively, color images where a plurality of color pixel values are correlated to the respective pixels; the pixel value correction section executes the calculating operation for respective ones of the plurality of colors; and the change determination section obtains distances of either mutually corresponding pixels or regions between the reference image and the post-correction comparison image acquired through the pixel value correction section and that determines the presence or absence of a change in the object in accordance with the distances.

16. The object monitoring apparatus according to claim 9, further comprising, in a stage before the pixel value correction section, a misalignment correction section that corrects a positional misalignment and/or rotational misalignment between the reference image and the comparison image.

17. A non-transitory compute-readable medium which stores an object monitoring program that is executed in an information processing apparatus and that causes the information processing apparatus to operate as an object monitoring apparatus that monitors the presence or absence of a change in an object by performing a comparison between a reference image acquired by capturing the object at a first time and a comparison image acquired by capturing the object at a second time, wherein the object monitoring program causes the information processing apparatus to operate as the object monitoring apparatus comprising:
  a pixel value correction section that causes an average and variance of pixels values of pixels in a second subregion, inclusive of a first subregion formed of one or more pixels, in the comparison image resolved into a plurality of pixels to match with an average and variance of pixel values in a subregion corresponding to the second subregion on the reference image similarly resolved into a plurality of pixels, thereby to execute a calculating operation that corrects the pixel value of each pixel in the first subregion in the comparison image by recognizing each of a plurality of subregions to be the first subregion, the plurality of subregions being obtained when the comparison image is divided into the plurality of subregions respectively inclusive of being formed of only one pixel; and
  a change determination section that determines the presence or absence of a change in the object by performing a comparison between the reference image and a post-correction comparison image acquired by being corrected in the pixel value correction section,
  wherein the pixel value correction section executes correction in a manner that, where the average and variance of the pixel values in the second subregion inclusive of the first subregion in the event that either one pixel present in a position (x, y) in the comparison image or a set of a plurality of pixels present in positions (x, y) when x, y is a variable are, respectively, represented by $E_1$ and $S_1^2$, and the average and variance of the pixel values in the subregion corresponding to the second subregion of the reference image are, respectively, represented as $E_0$ and $S_0^2$, a pixel value $f_1(x, y)$ of the pixel present in the position (x, y) in the comparison image is corrected to a post-correction pixel value $g(x, y)$ in accordance with $$g(x, y) = \sqrt{\frac{S_0^2}{S_1^2}} (f_1(x, y) - E_1) + E_0. \tag{1}$$

18. The non-transitory compute-readable medium according to claim 17, wherein the object monitoring program causes the information processing apparatus to operate as the object monitoring apparatus further comprising a differential calculating operation section that obtains a differential image formed from differentials between the pixel values of mutually corresponding pixels of the reference image and the post-correction comparison image acquired through the pixel value correction section, and
  wherein the change determination section determines the presence or absence of a change in the object in accordance with the differential image acquired at the differential calculating operation section.

19. The non-transitory compute-readable medium according to claim 17, wherein the pixel value correction section executes the calculating operation by recognizing the respective one pixel forming the comparison image to be the first subregion.

20. The non-transitory compute-readable medium according to claim 17, wherein the average and variance of the pixel values in the subregion corresponding to the second subregion of the reference image are, respectively, represented as $E_0$ and $S_0^2$, when $$h(x, y) = \begin{cases} 1 & f_0(x, y) \geq E_0 \\ -1 & f_0(x, y) < E_0, \end{cases}$$

21. The non-transitory compute-readable medium according to claim 20, wherein the pixel value correction section determines that the edge is included in the second subregion when the variance of the pixel values in the second subregion exceeds a predetermined threshold value.

22. The non-transitory compute-readable medium according to claim 17, wherein the reference image and the comparison image are, respectively, color images where pixel values of a plurality of colors are correlated to the respective pixels; the pixel value correction section executes the calculating operation for at least one color; and the change determination section determines the presence or absence of a change in the object by performing a comparison for at least one color between the reference image and the post-correction comparison image acquired through the pixel value correction section.

23. The non-transitory compute-readable medium according to claim 17, wherein the reference image and the comparison image are, respectively, color images where a plurality of color pixel values are correlated to the respective pixels; the pixel value correction section executes the calculating operation for respective ones of the plurality of colors; and the change determination section obtains distances of either mutually corresponding pixels or regions between the reference image and the post-correction comparison image acquired through the pixel value correction section and that determines the presence or absence of a change in the object in accordance with the distances.

24. The non-transitory compute-readable medium according to claim 17, wherein the object monitoring program causes the information processing apparatus to operate as the object monitoring apparatus further comprising a misalignment correction section that corrects a positional misalignment and/or rotational misalignment between the reference image and the comparison image, the misalignment correction being executed before the pixel value correction section.

* * * * *

UNITED STATES PATENT AND TRADEMARK OFFICE
CERTIFICATE OF CORRECTION

PATENT NO. : 8,144,928 B2
APPLICATION NO. : 12/084993
DATED : March 27, 2012
INVENTOR(S) : Ryoji Ohba et al.

It is certified that error appears in the above-identified patent and that said Letters Patent is hereby corrected as shown below:

In the claims

Column 16, Line 45, In Claim 1, delete "$f_2(x, y)$" and insert -- $f_1(x, y)$ --, therefor.
Column 16, Lines 49-52 (Approx.), In Claim 1, delete
" $g(x,y) = \sqrt{\dfrac{S_0^2}{S_1^2}}(f_1(x,y) - E_1) + E_0.$  (1) " and
insert -- $g(x,y) = \sqrt{\dfrac{S_0^2}{S_1^2}}(f_1(x,y) - E_1) + E_0$ wherein g(x,y) is a corrected density value. --, therefor.

Column 17, Lines 7-10 (Approx.), In Claim 4, delete " $h(x,y) = \begin{cases} 1 & f_0(x,y) \geqq E_0 \\ -1 & f_0(x,y) < E_0 \end{cases}$ ," and
insert -- $h(x,y) = \begin{cases} 1 & f_0(x,y) \geqq E_0 \\ -1 & f_0(x,y) < E_0 \end{cases}$ --, therefor.

Column 18, Lines 22-24 (Approx.), In Claim 9, delete " $g(x,y) = \sqrt{\dfrac{S_0^2}{S_1^2}}(f_1(x,y) - E_1) + E_0.$  (1) "
and insert -- $g(x,y) = \sqrt{\dfrac{S_0^2}{S_1^2}}(f_1(x,y) - E_1) + E_0$ wherein g(x,y) is a corrected density value. --, therefor.

Column 18, Lines 47-49 (Approx.), In Claim 12, delete " $h(x,y) = \begin{cases} 1 & f_0(x,y) \geqq E_0 \\ -1 & f_0(x,y) < E_0 \end{cases}$ ," and
insert -- $h(x,y) = \begin{cases} 1 & f_0(x,y) \geqq E_0 \\ -1 & f_0(x,y) < E_0 \end{cases}$ --, therefor.
Column 19, Line 16 (Approx.), In Claim 17, delete "compute-readable" and insert -- computer-readable --, therefor.

Signed and Sealed this
Second Day of February, 2016

Michelle K. Lee
*Director of the United States Patent and Trademark Office*

CERTIFICATE OF CORRECTION (continued)
U.S. Pat. No. 8,144,928 B2

Column 19, Lines 62-64 (Approx.), In Claim 17, delete "$g(x,y) = \sqrt{\frac{S_0^2}{S_1^2}}(f_1(x,y) - E_1) + E_0.$ (1)"

and insert -- $g(x,y) = \sqrt{\frac{S_0^2}{S_1^2}}(f_1(x,y) - E_1) + E_0$ wherein g(x,y) is a corrected density value. --, therefor.

Column 20, Line 1, In Claim 18, delete "compute-readable" and insert -- computer-readable --, therefor.

Column 20, Line 14, In Claim 19, delete "compute-readable" and insert -- computer-readable --, therefor.

Column 20, Line 19, In Claim 20, delete "compute-readable" and insert -- computer-readable --, therefor.

Column 20, Lines 25-27 (Approx.), In Claim 20, delete "$h(x,y) = \begin{cases} 1 & f_0(x,y) \geq E_0 \\ -1 & f_0(x,y) < E_0 \end{cases}$," and insert -- $h(x,y) = \begin{cases} 1 & f_0(x,y) \geq E_0 \\ -1 & f_0(x,y) < E_0 \end{cases}$ --, therefor.

Column 20, Line 29 (Approx.), In Claim 21, delete "compute-readable" and insert -- computer-readable --, therefor.

Column 20, Line 34 (Approx.), In Claim 22, delete "compute-readable" and insert -- computer-readable --, therefor.

Column 20, Line 46 (Approx.), In Claim 23, delete "compute-readable" and insert -- computer-readable --, therefor.

Column 20, Line 58 (Approx.), In Claim 24, delete "compute-readable" and insert -- computer-readable --, therefor.